US007920590B2

(12) United States Patent
Le et al.

(10) Patent No.: US 7,920,590 B2
(45) Date of Patent: Apr. 5, 2011

(54) WIRELESS COMMUNICATIONS SYSTEM HAVING BUILT-IN PACKET DATA COMPRESSION AND SUPPORT FOR ENABLING NON-STANDARD FEATURES BETWEEN NETWORK ELEMENTS

(75) Inventors: Khiem Le, Coppell, TX (US); Yousuf Saifullah, Flower Mound, TX (US); Yogesh Swami, Irving, TX (US)

(73) Assignee: Spyder Navigations L.L.C., Wilmington, DE (US)

( * ) Notice: Subject to any disclaimer, the term of this patent is extended or adjusted under 35 U.S.C. 154(b) by 1328 days.

(21) Appl. No.: 10/194,521

(22) Filed: Jul. 12, 2002

(65) Prior Publication Data

US 2004/0008650 A1    Jan. 15, 2004

(51) Int. Cl.
*H04J 3/22* (2006.01)
(52) U.S. Cl. .................. 370/467; 370/469; 370/493
(58) Field of Classification Search .................. 370/463, 370/493–495, 229, 235, 310, 464–467; 709/232, 709/240
See application file for complete search history.

(56) References Cited

U.S. PATENT DOCUMENTS

| | | | | |
|---|---|---|---|---|
| 5,838,927 | A * | 11/1998 | Gillon et al. .................. | 709/247 |
| 6,104,929 | A | 8/2000 | Josse et al. .................. | 455/445 |
| 6,246,672 | B1 | 6/2001 | Lumelsky .................. | 370/310 |
| 6,397,259 | B1 | 5/2002 | Lincke et al. .................. | 709/236 |
| 6,425,125 | B1 * | 7/2002 | Fries et al. .................. | 717/168 |
| 6,466,556 | B1 | 10/2002 | Boudreaux .................. | 370/331 |
| 6,490,278 | B1 * | 12/2002 | Michelson et al. .................. | 370/389 |
| 6,542,992 | B1 | 4/2003 | Peirce, Jr. et al. .................. | 713/153 |
| 6,567,667 | B1 | 5/2003 | Gupta et al. .................. | 455/445 |
| 6,577,637 | B1 * | 6/2003 | Sieppi .................. | 370/401 |
| 6,608,841 | B1 | 8/2003 | Koodli .................. | 370/474 |
| 6,717,928 | B1 * | 4/2004 | Kalliokulju et al. .................. | 370/335 |
| 6,745,012 | B1 * | 6/2004 | Ton et al. .................. | 455/67.13 |
| 6,763,031 | B1 * | 7/2004 | Gibson et al. .................. | 370/428 |
| 6,775,270 | B1 * | 8/2004 | Rhodes et al. .................. | 370/352 |
| 6,816,458 | B1 * | 11/2004 | Kroon .................. | 370/235 |
| 6,839,339 | B1 * | 1/2005 | Chuah .................. | 370/349 |
| 7,010,727 | B1 * | 3/2006 | Stucker .................. | 714/52 |
| 7,245,636 | B1 * | 7/2007 | Hans et al. .................. | 370/474 |
| 2001/0055291 | A1 * | 12/2001 | Schweitzer .................. | 370/337 |
| 2002/0001298 | A1 * | 1/2002 | Tourunen et al. .................. | 370/349 |
| 2002/0089993 | A1 * | 7/2002 | Suumaki et al. .................. | 370/405 |

(Continued)

*Primary Examiner* — William Trost, IV
*Assistant Examiner* — Roberta A Shand

(57) ABSTRACT

A mobile station (100) and a compression/decompression node in a wireless network (5), preferably the GGSN 30 (30), agree on whether to apply compression/decompression, and what compression/decompression scheme to use either by pre-configuration (when the GGSN 30 is in the home network of the mobile terminal) or by signalling (when the GGSN 30 is in a visited or a roamed-to network). Additional information, such as a profile-specific dictionary, may be used to increase the compression efficiency, particularly during start-up. Dynamic data can also be accommodated. The compression/decompression may be turned on and off on a packet-by-packet basis, depending on whether the compression actually results in a smaller packet. A compressed/uncompressed indicator bit or bits can be inserted explicitly on a per packet basis, and/or the compressed/uncompressed indication can be derived implicitly. A desired data compression/decompression algorithm, or any desired Proprietary Feature, can be signaled, possible without requiring standardization changes, by using a Packet Data Protocol PDP Context Activation message with a predetermined Access Point Name (APN) message information element that is sent from a first network element to a second network element for at least identifying the desired compression/decompression algorithm. It another embodiment, for the case where Proprietary Feature capability is exchanged between a RAN and a UE network element, a transmission of an extension to a UE Capability Enquiry message is sent to the UE for identifying the Proprietary Feature.

18 Claims, 26 Drawing Sheets

APPLICATION EXAMPLE #1 — PAYLOAD COMPRESSION BETWEEN SGSN AND MS

U.S. PATENT DOCUMENTS

| | | | |
|---|---|---|---|
| 2002/0091860 A1* | 7/2002 | Kalliokulju et al. | 709/247 |
| 2003/0007695 A1* | 1/2003 | Bossut et al. | 382/239 |
| 2003/0009583 A1* | 1/2003 | Chan et al. | 709/236 |
| 2003/0081592 A1* | 5/2003 | Krishnarajah et al. | 370/352 |
| 2003/0093540 A1* | 5/2003 | Lioy | 709/230 |
| 2004/0009761 A1* | 1/2004 | Money et al. | 455/406 |
| 2004/0148425 A1* | 7/2004 | Haumont et al. | 709/236 |
| 2004/0248583 A1* | 12/2004 | Satt et al. | 455/452.2 |

* cited by examiner

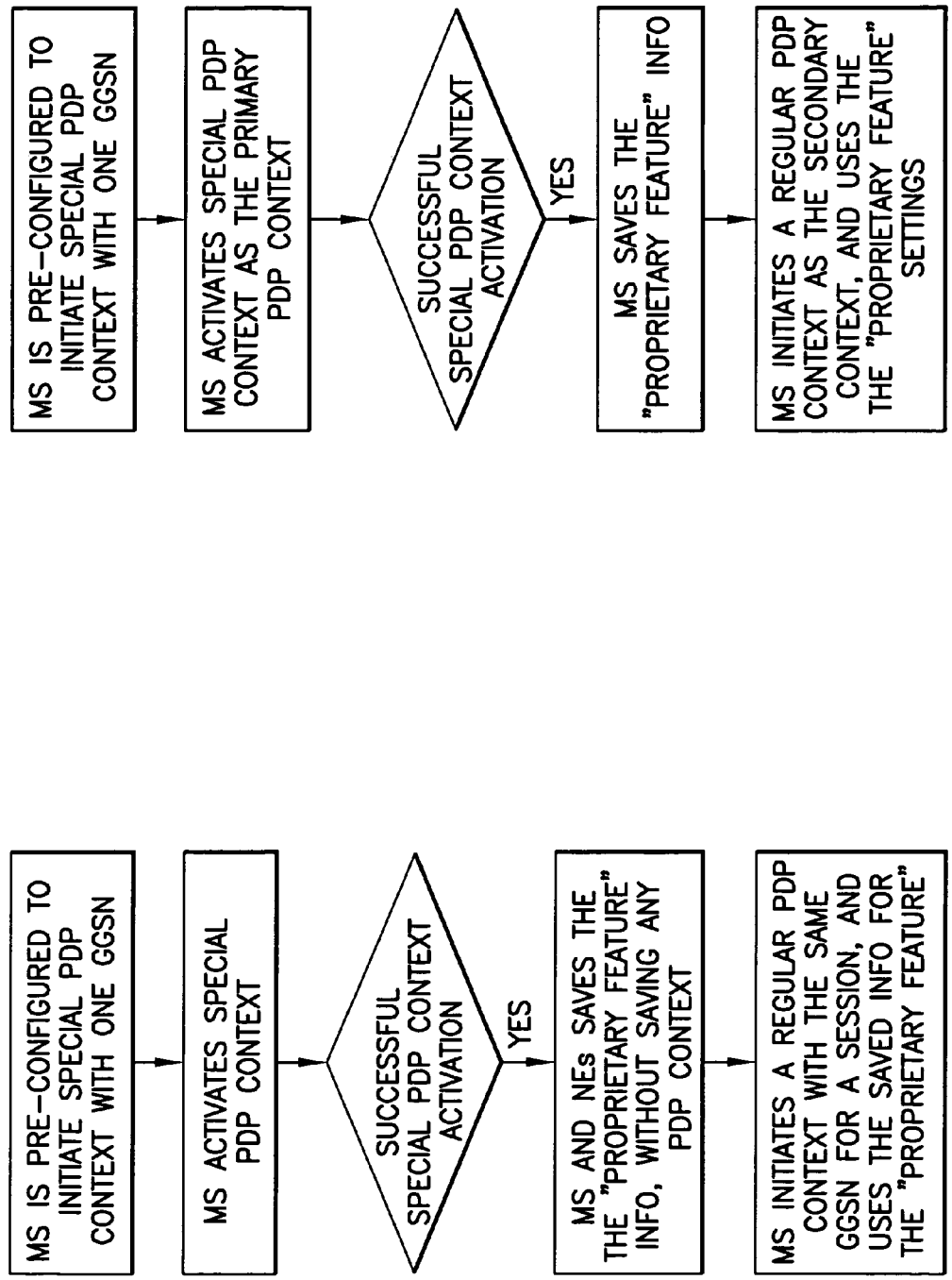
FIG.6 PROPRIETARY FEATURE INVOCATION WITH DYNAMIC GGSN
FIG.5 PROPRIETARY FEATURE INVOCATION WITH STATIC GGSN

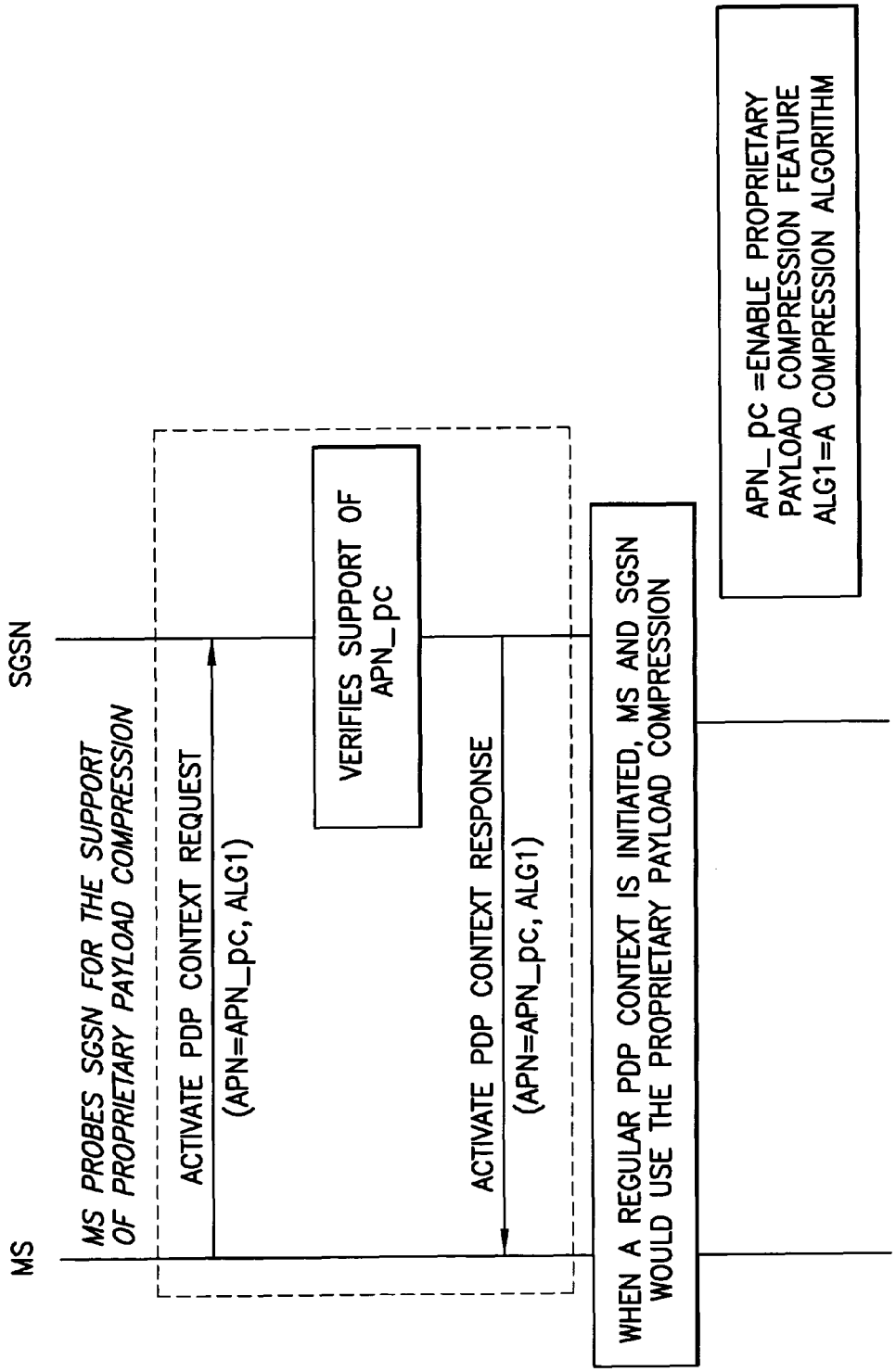

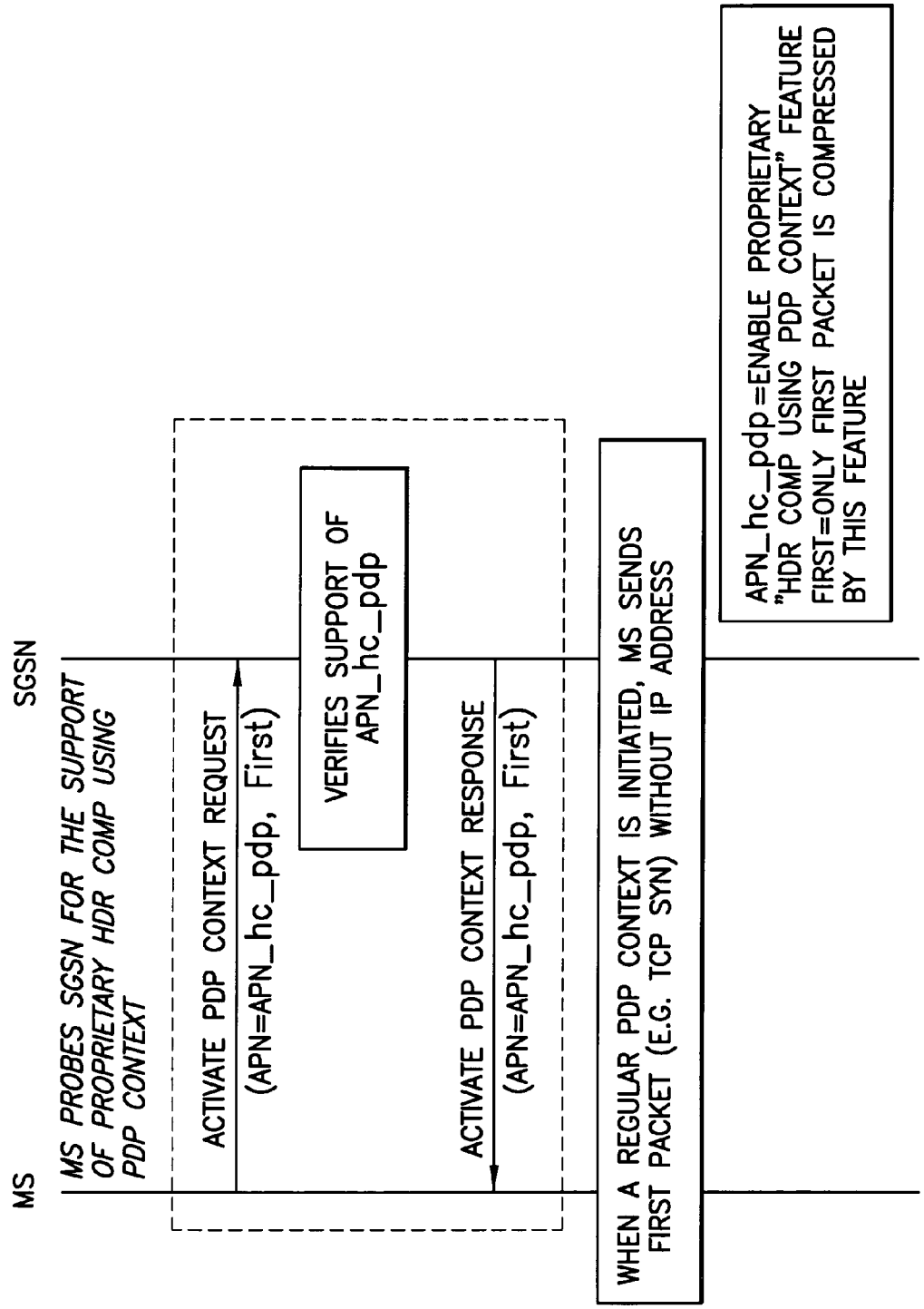

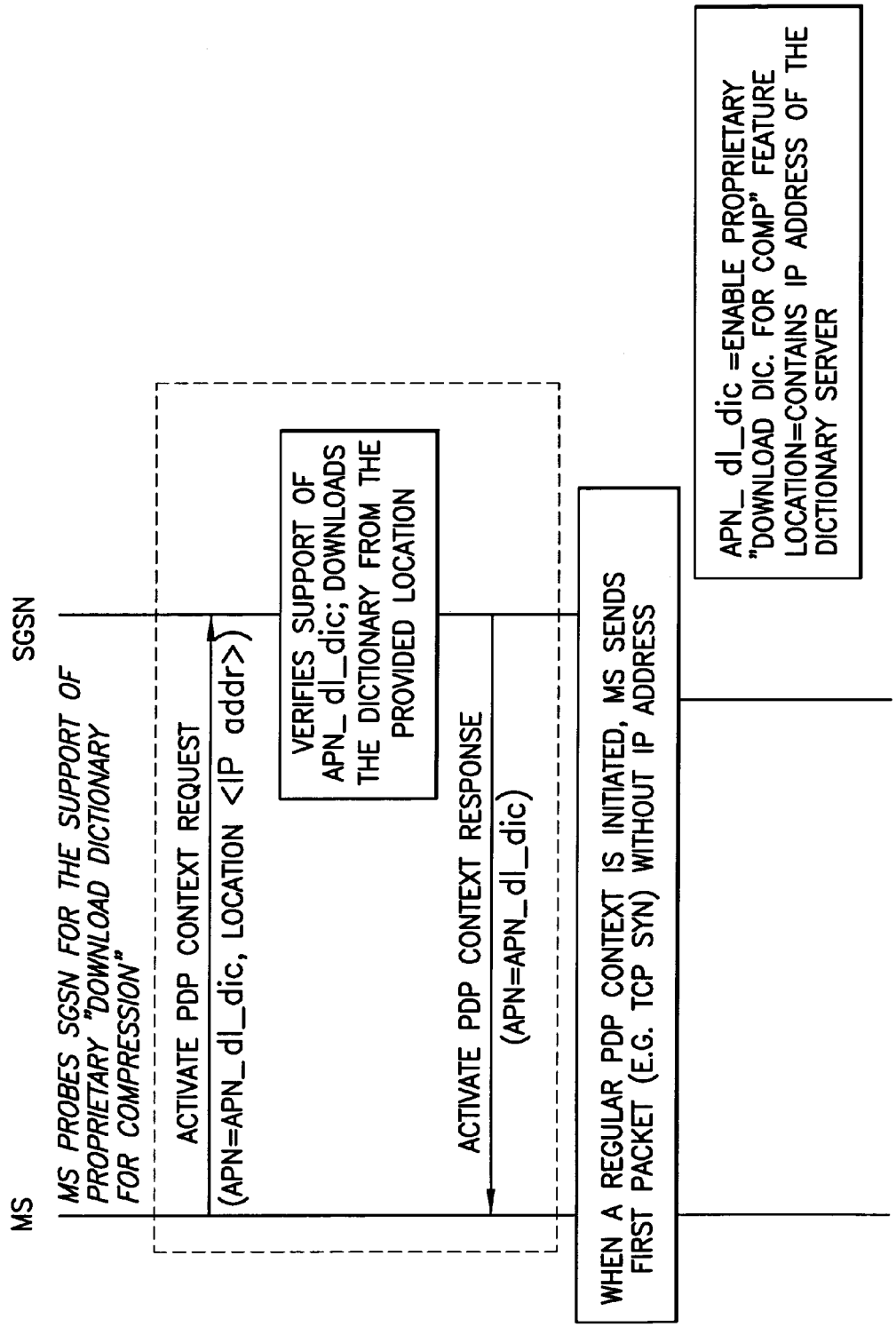

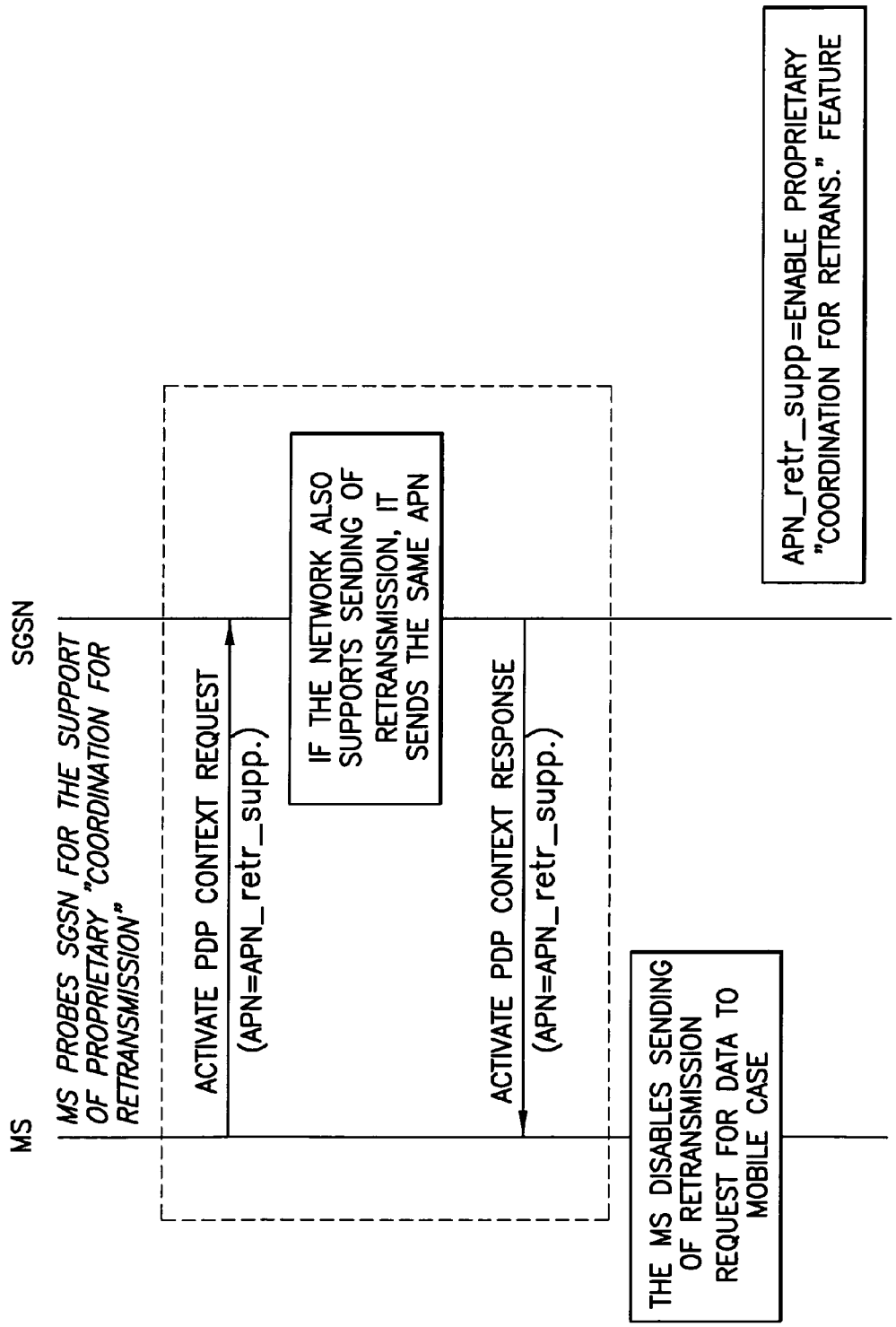

INTERWORKING AMONG MS, SGSN AND GGSN – MS INVOKES FEATURE AND GGSN DOESN'T SUPPORT APNx

INTERWORKING AMONG MS, SGSN AND GGSN — GGSN INVOKES FEATURE AND MS DOESN'T SUPPORT APNx ental Theory of Communication", The Bell System Technical Journal, Vol. 27, pp. 379-423, 623-656, July, October, 1948.
WIRELESS COMMUNICATIONS SYSTEM HAVING BUILT-IN PACKET DATA COMPRESSION AND SUPPORT FOR ENABLING NON-STANDARD FEATURES BETWEEN NETWORK ELEMENTS

TECHNICAL FIELD

These teachings relate generally to wireless communications systems, such as cellular telecommunications systems and, more specifically, relate to wireless communications systems that employ data compression techniques when transmitting data over a wireless (RF) link.

BACKGROUND

A goal of data compression is to algorithmically process a block of input data of size X bits to produce a block of output data of size Y bits, where X>Y. The output block of data may then be more efficiently stored and transmitted. The compression operation maybe lossless or lossy, depending on the selected algorithm. Lossless data compression implies that the original data can be faithfully and exactly recovered after the compressed data is decompressed. Lossy compression is typically used for image data, where some amount of quality degradation can be tolerated in order to significantly reduce the bandwidth requirement to transmit the image data and/or the memory requirement to store the image data. Fundamental data compression algorithms include arithmetic coding, pulse code modulation, differential pulse code modulation, run-length coding, Shannon-Fano coding, Huffman coding, discrete cosine transform and various dictionary methods. The data compression ratio is determined by dividing the original amount of data by the amount that is obtained from the compression operation. The fundamentals of modem data compression were established by C. E. Shannon in "A Mathematical Theory of Communication", The Bell System Technical Journal, Vol. 27, pp. 379-423, 623-656, July, October, 1948.

The use of data compression yields a number of benefits in modem cellular telecommunications systems, particularly in those that transmit and receive packet data such as in the General Packet Radio Service (GPRS). A first benefit is an improved radio usage efficiency, since fewer bits need to be transmitted over the air interface. A second benefit is a higher throughput performance, since fewer bits have to be transmitted, and therefore the probability of packet loss is reduced. This is particularly important for protocols such as the Transmission Control Protocol (TCP), where the loss of a packet may seriously degrade the throughput (e.g., the loss of a packet can result in a slow start). Another benefit is improved bandwidth usage on wireline links between the data compressor and the decompressor.

It is known in the prior art to provide some packet payload compression from attached proxies, especially for TCP applications. However, the proxy-based approach has the following drawbacks: (a) it adds a single point of failure; and (b) it lacks flexibility, as the data traffic is required to transit through the proxy.

For some specific applications, such as one known as the Session Initiated Protocol (SIP) that is operating through a Call Server Control Function (CSCF), the data packet payload compression/decompression is intended to be done through the CSCF. However, the use of this technique is essentially restricted to the application level, and thus does not provide a general widespread benefit.

It is also the case that some packet payload and/or header compression has been defined in the Radio Access Network (RAN) Packet Data Convergence Protocol (PDCP), or in the Serving GPRS Support Node (SGSN), specifically in a Sub-Network Dependent Convergence Protocol (SNDCP). However, these approaches require that specific negotiations occur between the mobile station (MS) and the wireless network, and do not provide the benefit of compression between the network compression/decompression point (RAN or SGSN) and the Gateway GPRS Support Node (GGSN). One drawback is that the packet data flowing through the IP network, i.e., between the SGSN and the GGSN, is not compressed, and thus greater bandwidth must be provided.

Existing GSM GPRS protocols offer payload compression by using V.42bis and V.44 standards, while existing UMTS GPRS protocols do not offer any payload compression In some instances the use and/or specifics of data compression may be a proprietary wireless network feature and thus is not required to be standardized in the sense that normal network operation is standardized and applied by various manufacturers who make equipment for connecting to the wireless network. In this case it can be appreciated that the signaling or handshake exchange between the mobile station and the network must be accomplished in a way that enables the use of the proprietary feature, but without requiring that the signaling itself be the subject of standardization.

A proprietary feature normally cannot be implemented in a multi-vendor standardized environment, as it requires special proprietary signalling between elements (the Network Elements and/or the mobile station), and such signalling can cause errors if the intended recipient cannot interpret correctly the proprietary signalling.

In a strong competitive market, such as GPRS, the value added provided by a novel and/or useful proprietary feature can be a strong business differentiator. Thus, it would be desirable and important to provide an ability to implement such proprietary features, for example in the GPRS/UMTS standardized environment, without affecting correct operation and interoperability when interacting with network elements supplied by other vendors.

SUMMARY OF THE PREFERRED EMBODIMENTS

The foregoing and other problems are overcome, and other advantages are realized, in accordance with the presently preferred embodiments of these teachings.

The teachings in accordance with this invention both address and solve the problem of providing an efficient resource utilization on the radio link and in the wireless network, and the optimization of throughput performance, by a data compression method, apparatus and system.

Improvements are realized in throughput and radio resource optimization of Internet Protocol (IP)-based applications (such as TCP) over links such as, but not limited to, cellular links. This invention is applicable to all radio systems using, for example, the GPRS/UMTS (General Packet Radio System/Universal Mobile Telecommunications System) architecture. This invention is even more broadly applicable to systems where there is a known network node where the user plane transits, and where compression/decompression can take place. No change to the application protocol (e.g. TCP) is required, and no change to the radio layer specifications is required. That is, the use of the compression/decompression can be essentially transparent to the already established air interface protocols and procedures, and does not require that changes be made to the existing air interface specifications (e.g., 3GPP or IETF standardization changes are not required, although making such changes is also not precluded). The use of the compression/decompression technique can be made an operator-specific feature.

In the presently preferred embodiment of this invention, for downlink data (i.e., data being transmitted from the wireless network to a mobile station or terminal) the data (the packet payload and/or header) is compressed at the GGSN and decompressed at the mobile terminal. For uplink data (i.e., data being transmitted from the mobile terminal to the wireless network), the data is compressed at the mobile terminal and is decompressed at the GGSN.

In accordance with the presently preferred embodiment the mobile terminal and the compression/decompression node in the network (e.g., the GGSN) agree on whether to apply compression/decompression, and what compression/decompression scheme to use either by pre-configuration (when the GGSN is in the home network of the mobile terminal) or by signaling (when the GGSN is in a visited or a roamed-to network). Additional information, such as a profile-specific dictionary, may be used to increase the compression efficiency, particularly during start-up. Dynamic data can also be accommodated. The compression/decompression may be turned on and off on a packet-by-packet basis, depending on whether the compression actually results in a smaller packet. For example, a packet to be transmitted can be compressed, and the compressed packet or the original (uncompressed) packet can then be sent depending on the amount of bandwidth and/or other type of savings achieved. A compressed/uncompressed indicator bit or bits can be inserted explicitly on a per packet basis, and/or the compressed/uncompressed indication can be derived implicitly.

Advantages that are realized by the use of this invention include, but need not be limited to, the following: (a) no additional network node (proxy) is required to perform the compression/decompression operation; (b) the method is applicable for all packet traffic, not just the packet traffic passing through a proxy or the CSCF, since all packet traffic transits through GGSN; (c) the invention provides the full benefits of compression over the air interface, as well as on wireline links leading up to the GGSN; and (d) any suitable compression scheme or algorithm can be used, including proprietary compression schemes and algorithms.

Although the compression ratio may vary, even when using a simple algorithm one can readily obtain a compression ratio of about 1.5 for text-based messages, which results in about a 40% reduction in RF spectrum usage.

When the GGSN is located in the visited network, the use of this invention is applicable without requiring a change to existing standardization, so long as there exists a means for the mobile terminal and the GGSN or the SGSN to mutually identify each other as having the data compression/decompression feature implemented. In general, this invention is applicable to all radio technologies that use a GGSN, or that use some network node that is equivalent to the GGSN.

In a further aspect of this invention there is provided a method for enabling proprietary features involving the Mobile Terminal or Mobile Station (MT or MS) and Network Elements (NE) to improve TCP protocol performance in a GPRS/UMTS wireless network. The enabling mechanism described herein does not require standardization and can itself be implemented on a proprietary basis.

This invention may be used, however, to implement any desired type of proprietary feature, and is not limited to the implementation of proprietary features that are intended to improve TCP performance.

A desired data compression/decompression algorithm, or any desired Proprietary Feature, can be signaled, without requiring standardization changes, by using a Packet Data Protocol (PDP) Context Activation message with a predetermined Access Point Name (APN) message information element that is sent from a first network element to a second network element for at least identifying the desired compression/decompression algorithm.

It is also within the scope of this invention, for a case where Proprietary Feature capability is exchanged between a RAN and a UE network element, to transmit an extension to a UE Capability Enquiry message to the UE for identifying the Proprietary Feature and, at a UE that does not support the Proprietary Feature, to ignore the content of the extension, while at a UE that does support the Proprietary Feature, to accept the extension as an enquiry for processing in accordance with the supported Proprietary Feature.

A random number can be sent to the UE which then uses an algorithm with the random number when generating a response. The response is sent back to the RAN, and the same algorithm is used with the random number to verify the response for the RAN.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 3 is a logic flow diagram in accordance with a method of this invention; and FIGS. 4-28 are logic flow diagrams and signaling flow diagrams that are useful in explaining the operation of the signaling of a desired Proprietary Feature by using a Packet Data Protocol PDP Context Activation message with a predetermined Access Point Name (APN) message information element, wherein FIG. 4 is a signal flow diagram showing interworking among the MS, SGSN and GGSN, when the MS invokes a certain Proprietary Feature;

FIG. 5 is a logic flow diagram showing Proprietary Feature invocation for a static GGSN;

FIG. 6 is a logic flow diagram showing Proprietary Feature invocation for a dynamic GGSN;

FIG. 7 is a signal flow diagram for a first application example of data packet payload compression between the SGSN and the MS using PDP Context information;

FIG. 8 is a signal flow diagram for a second application example of data packet header compression between the SGSN and the MS using PDP Context information;

FIG. 9 is a signal flow diagram for a third application example where a customized compression dictionary is downloaded to the MS;

FIG. 10 is a signal flow diagram for a fourth application example where the Proprietary Feature comprises a coordination for the retransmission of TCP packets;

FIG. 11 is a signal flow diagram showing interworking among the MS, SGSN and GGSN, when the MS invokes a certain Proprietary Feature, and where further proprietary signalling is carried by PDUs, if required;

FIG. 12 is a signal flow diagram showing interworking among the MS, SGSN and GGSN, when the SGSN invokes a FIG. 13 is a signal flow diagram showing interworking among the MS, SGSN and GGSN, when the GGSN invokes a Proprietary Feature, and where further proprietary signalling is carried by PDUs, if required;

FIG. 14 is a signal flow diagram showing interworking among the MS and SGSN, when the MS invokes a Proprietary Feature, and where further proprietary signalling is carried by PDUs, if required;

FIG. 15 is a signal flow diagram showing interworking among the MS and SGSN, when the SGSN invokes a Proprietary Feature, and where further proprietary signalling is carried by PDUs, if required;

FIG. 16 is a signal flow diagram showing interworking among the MS and GGSN, when the MS invokes a Proprietary Feature, and where further proprietary signalling is carried by PDUs, if required;

FIG. 17 is a signal flow diagram showing interworking among the MS and GGSN, when the GGSN invokes a Proprietary Feature, and where further proprietary signalling is carried by PDUs, if required;

FIG. 18 is a signal flow diagram showing interworking among the SGSN and GGSN, when the SGSN invokes a Proprietary Feature, and where further proprietary signalling is carried by PDUs, if required;

FIG. 19 is a signal flow diagram showing interworking among the SGSN and GGSN, when the GGSN invokes a Proprietary Feature, and where further proprietary signalling is carried by PDUs, if required;

FIG. 20 is a signal flow diagram showing interworking among the MS, SGSN and GGSN, when the MS invokes a certain Proprietary Feature, and all of the network elements support the associated APNx;

FIG. 21 is a signal flow diagram showing interworking among the MS, SGSN and GGSN, when the MS invokes a certain Proprietary Feature, and where only the GGSN does not support the associated APNx;

FIG. 22 is a signal flow diagram showing interworking among the MS, SGSN and GGSN, when the MS invokes a certain Proprietary Feature, and where only the SGSN does not support the associated APNx;

FIG. 23 is a signal flow diagram showing interworking among the MS, SGSN and GGSN, when the SGSN invokes a certain Proprietary Feature, and all of the network elements support the associated APNx;

FIG. 24 is a signal flow diagram showing interworking among the MS, SGSN and GGSN, when the SGSN invokes a certain Proprietary Feature, and where only the MS does not support the associated APNx;

FIG. 25 is a signal flow diagram showing interworking among the MS, SGSN and GGSN, when the SGSN invokes a certain Proprietary Feature, and where only the GGSN does not support the associated APNx;

FIG. 26 is a signal flow diagram showing interworking among the MS, SGSN and GGSN, when the GGSN invokes a certain Proprietary Feature, and all of the network elements support the associated APNx;

FIG. 27 is a signal flow diagram showing interworking among the MS, SGSN and GGSN, when the GGSN invokes a certain Proprietary Feature, and where only the SGSN does not support the associated APNx; and FIG. 28 is a signal flow diagram showing interworking among the MS, SGSN and GGSN, when the GGSN invokes a certain Proprietary Feature, and where only the MS does not support the associated APNx.

DETAILED DESCRIPTION OF THE PREFERRED EMBODIMENTS

Figure 1:
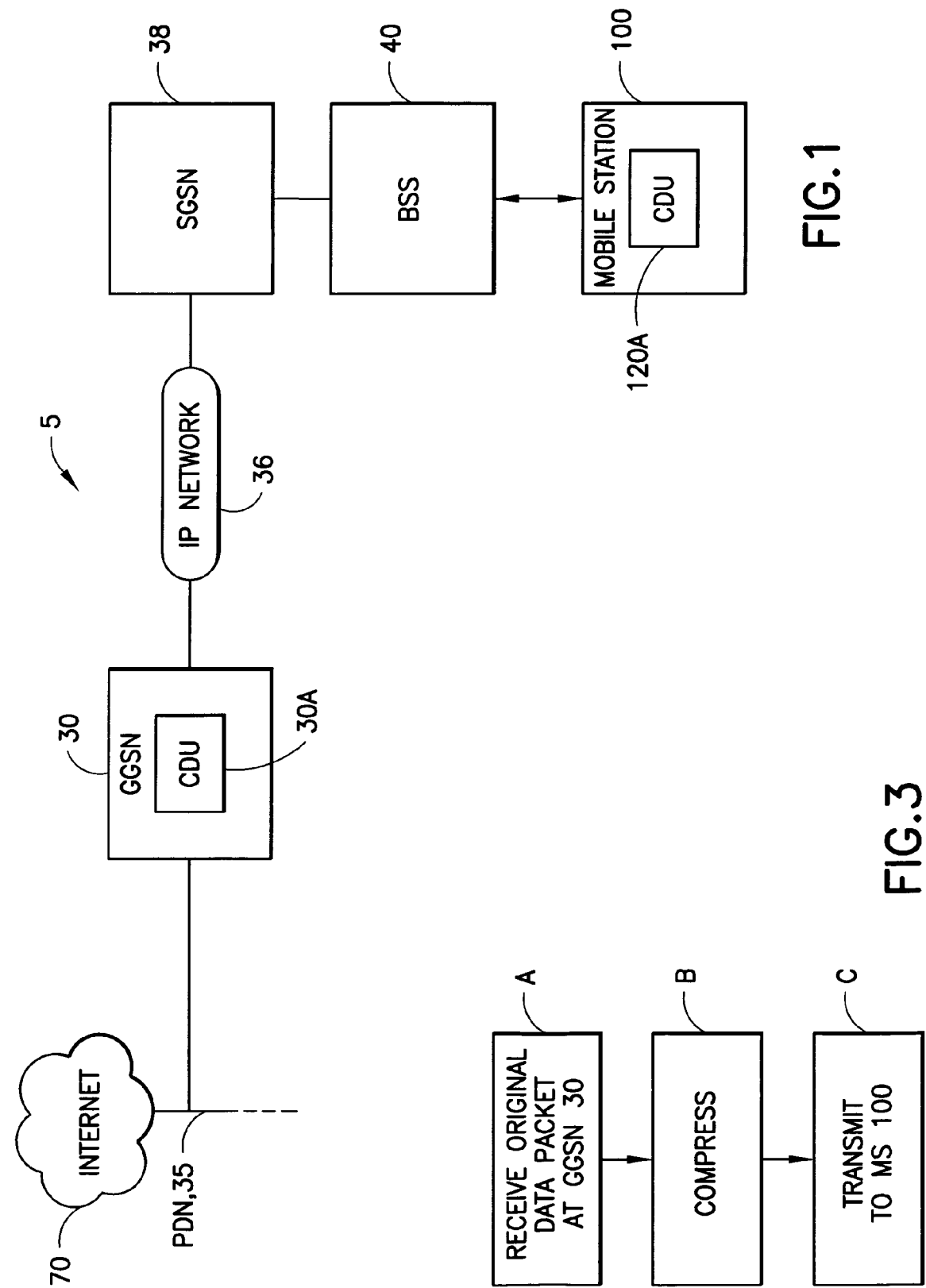
FIG. 1 is a simplified block diagram of a wireless communications system that is suitable for practicing this invention.
Figure 2:
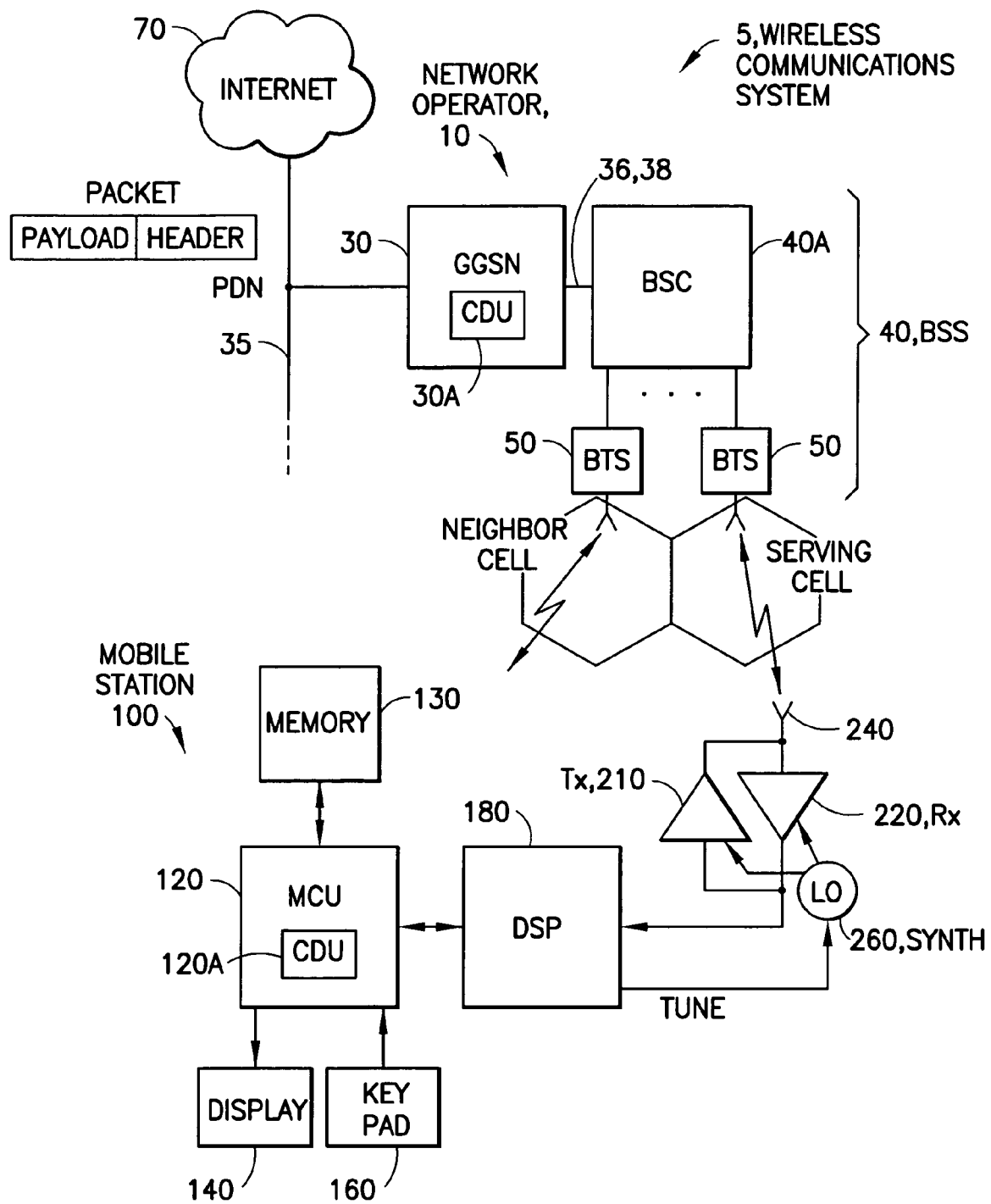
FIG. 2 is a more detailed block diagram of the wireless communications system of FIG. 1.

Referring to FIGS. 1 and 2, there are illustrated simplified block diagrams of an embodiment of a wireless communications system 5 that is suitable for practicing this invention. The wireless communications system 5 includes at least one mobile station (MS) 100. FIG. 1 also shows an exemplary network operator 10 having, for example, a Gateway GPRS Support Node (GGSN) 30 for connecting to a telecommunications network, such as a Public Packet Data Network or PDN 35. The network operator 10 also includes a base station system (BSS) 40, which may also be referred to as a Radio Access Network (RAN), that includes at least one base station controller (BSC) 40A and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator 10, which conveys mobile originated access requests and traffic. Packet data appearing at the PDN 35 may conform to any suitable format, and will typically include a packet header and a packet payload, as is well known in the art.

The air interface standard can conform to any suitable standard or protocol, and may enable both voice and data traffic, such as packet data traffic enabling Internet 70 access and web page downloads. In the presently preferred embodiment of this invention the air interface standard is a Time Division Multiple Access (TDMA) air interface that supports a GSM or an advanced GSM protocol and air interface, although these teachings are not intended to be limited to TDMA or to GSM or GSM-related wireless systems. For example, these teachings can also be applied to both narrowband and wideband Code Division Multiple Access (CDMA) systems.

The mobile station 100 typically includes a microcontroller (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MS 100, such as the MCU 120, to execute the software routines required to implement the methods in accordance with these teachings, in particular data decompression for downlink data and data compression for uplink data. As such, and for convenience, the MCU 120 is shown as including a compression/decompression sub-system or unit (CDU) 120A. The ROM is also assumed to store executable code for enabling the MS 100 to operate with the network operator to make and receive voice and data calls. The ROM may also store code for providing a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator (LO) 260, such as a frequency synthesizer, is provided for tuning the transceiver. Data, such as digitized voice and packet data, is transmitted and received through the antenna 240.

The foregoing embodiment of the MS 100 should be seen as being exemplary, and in no way imposing a limitation or limitations upon the practice of this invention. For example, it should be noted that in other embodiments the compression/decompression sub-system or unit (CDU) could be located elsewhere in the MS 100, and in some embodiments could be embodied in one or more dedicated logical units that are separate from the MCU 120 and from the DSP 180.

Referring more specifically to FIG. 1, it can be seen that the between the GGSN 30 and the BSS 50 is interposed an IP network 36 and the SGSN 38. All packet data flowing between the PDN 35 and the MS 100 transits the IP network 36 and the GGSN 30. In general, the GGSN 30 may be considered as a gateway to the PDN 35 for the GPRS network, as it tunnels PDUs, such as IP packets, to the current point of attachment of the MS 100 (e.g., to the SGSN 38).

In the presently preferred embodiment the GGSN network node 30 is assumed to also include a data processor that operates in accordance with a stored program for performing the compression/decompression operations in cooperation with the compression/decompression operations performed by the CDU 120A of the mobile station 100. For convenience, the GGSN 30 is shown to also include a CDU 30A. These teachings are not, however, limited only to the use of GGSN network node 30 for embodying the CDU 30A as, for example, the SGSN 38 could be used.

In the preferred embodiment the GGSN 30 is employed to host the CDU 30A, as all packet traffic to or from the MS 100 must pass or transit through it, and therefore the compression/decompression of the packet traffic at this location can occur without rerouting the traffic to another node, such as a proxy node. Furthermore, it can be appreciated that by placing the CDU 30A in the GGSN 30, and not the SGSN 38, that packet data transiting the IP network 36 can be compressed packet data, thereby conserving IP network bandwidth (it being remembered that the GGSN 30 is typically servicing a number of mobile stations 100.

Discussing first the case of downlink traffic, a packet incoming into the GGSN 30 from the PDN 35 is referred to as an original packet. Note that the original packet may already be compressed by some other entity, such as by a server in the Internet 70, and that the GGSN 30 may not be aware of the prior compression. If CPU loading caused by compression is a performance issue, the GGSN 30 may execute an algorithm to determine whether to compress the original packet. Various algorithms can be used for this purpose. For example, in a first embodiment the GGSN 30 determines if the data on a Packet Data Protocol (PDP) Context is compressible by compressing the first N1 packets.

In this discussion a PDP Context is assumed to be a logical pipe or connection associated with a particular application or task of the MS 100. For example, opening a web browser on the MS 100 results in a PDP context being established for the web browser application. Opening an email application can result in a second PDP context being established for the same MS 100. As such, a given MS 100 can have multiple PDP contexts in an active or running state, each being serviced by a particular assigned temporary block flow (TBF) at the level of the Radio Link Control/Media Access Control (RLC/MAC) of the BSS 40. The SSGN 30 maintains or has access to a record of IP addresses assigned to individual ones of the mobile stations 100, and uses these IP addresses for routing incoming data packets, possibly after compression, to the appropriate ones of the mobile stations 100. A given PDP Context may carry multiple TCP sessions, and multiple sessions can be established, one after another, for a given PDP Context.

Returning to the discussion of the first algorithm embodiment, if out of the compressed N1 packets there are M1 packets (M1 and N1 are parameters) for which the resulting compressed packet has a smaller size than the original packet, the packet data on the PDP context is deemed compressible, and subsequently received data packets on the PDP context are compressed. Otherwise no further attempts are made to compress packets on that particular PDP context. However, if subsequently there are M2 packets out of N2 packets (M2 and N2 are parameters) packets for which the result has a larger size than the original packet, then compression attempts are terminated.

In a second embodiment the algorithm executed by the GGSN 30 relies on control by the MS 100. In this case signalling, implicit or explicit, from the MS 100 informs the GGSN 30 as to whether packet data on a particular PDP context is compressible or is not compressible. Based on the signalling indication, the GGSN 30 compresses or does not compress the packets on the associated PDP context.

Explicit signalling may be carried by using, as an example, the IP Version field and byte stuffing.

In a third embodiment the algorithm executed by the GGSN 30 relies on the examination or "snooping" of fields carried in the packet to determine the data type. For example, many application layer protocols such as HTTP (for web page retrieval) and SMTP (for e-mail) associate a "Content-Type" or a "Multiple Internet Mail Extension" (MIME) type with content. The content type information is typically sufficient to determine if the content is compressed or is not compressed when received at the GGSN 30. For example, a content type of "Image/gif" indicates that the content is a GIF (compressed) image and therefore there is no need to compress it any further. Similarly a content type of "Application/Applet" indicates the presence of byte code of a Java™ application which may be compressible.

It is noted that in order to make use of MIME-type information, the compression and decompression units 30A and 120A preferably maintain state information concerning the content being sent. For example, a given CDU 30A or 120A may record the TCP sequence number, as well as the "Content-Length", for a data packet that has MIME/Content-Type information present in it. The CDU 30A or 120A then compresses or decompresses all subsequent packets that have a sequence number greater than the recorded sequence number, but less than the sum of content length and the present sequence number. The compression state is preferably reset once there is a new MIME type present in an incoming packet, or if the new incoming data packet has a sequence number that indicates that it is greater than the recorded content length.

In all cases it is preferred that an indicator, implicit or explicit, be attached to or otherwise associated with the output packet to indicate if the original packet was compressed by the GGSN 30 or was not compressed.

If the CDU 120A of the GGSN 120 has access to dictionary data, and knows that the counterpart decompressor of the CDU 120A also has access to the same dictionary, the CDU 30A can employ the dictionary to increase the compression ratio. As an example, dictionary data may contain dynamic data (see, for example, "Scalable, Robust, Efficient Dictionary-Based Compression (SCRIBE)", Internet draft, <draft-liu-rohc-scribe-01.txt>). In addition, the dictionary can be shared across all block flows from and to the same MS 100, thus resulting in a higher compression ratio than if the dictionary was specific to only one MS 100 flow.

As was stated above, the compressed/not compressed indicator may be implicit or explicit, and would be implicit when controlled by the MS 100. In this case, all packets belonging to a PDP context are compressed or are not compressed, and there is no need for an explicit compressed/not compressed indicator.

The compressed/not compressed indicator can also be implicitly given when snooping is performed to determine the compressibility of an original packet (e.g., by analyzing the MIME type). In this case the MIME type is not compressed and can be used to signal to the CDU 120A decompressor whether compression has been performed by the CDU 30A of the GGSN 30. To facilitate this mode of operation it is preferred that there is a pre-established agreement between the CDU 30A, 120A as to which MIME types are compressed and which are not.

When the compressed/not compressed indicator is explicit, it requires at least one bit for expression. However, more than one bit can be used, such as when it is desired to distinguish between different cases of a compressed/uncompressed packet header and/or a compressed/uncompressed packet payload. Therefore, there may be cases where processing by the CDU 30A of the GGSN 30 results in a larger packet than the original packet. To address this issue the 4-bit Internet Protocol (IP) version field need not be sent in the packet header, as it can be inferred from the PDP context activation. The resulting 4-bit savings resulting from not sending the IP version field can more than compensate for the inclusion of the compressed/not compressed indicator bit(s). Using this technique it can be assured that processing by the CDU 30A of the GGSN 30 always results in a packet of size equal to or smaller than the size of the original packet. As may be appreciated, some coordination is required with entities downstream so that these entities do not send the IP version as part of the packet header.

The compression algorithm used by the CDU 30A may be selected from a menu of algorithms known to be supported by the CDU 120A of the MS 100 (e.g., based on the subscriber profile associated with the MS 100), or it can be downloaded as byte code as described in, by example, "Universal Decompressor Virtual Machine (UDVM)", Internet draft, <draft-ietf-rohc-sigcomp-udvm-00.txt>. Note that the byte code need be downloaded only once, and not for every packet. Note further the menu may be limited to only one compression algorithm that is predefined by the MS 100 subscription profile, in which case it is not necessary to provide for signalling the compression algorithm that is in use.

In any case, the MS 100 decompresses a received data packet, or it does not decompress a received data packet, based on the signalling, explicit or implicit, that is attached to or otherwise associated with the received packet.

Having discussed the downlink packet traffic case, a discussion is now made of the uplink packet compression/decompression method.

In this case an original packet is a packet presented to compression entity of the CDU 120A, which may also be referred to as the MS_compressor. The original packet could be one that has been already compressed by some other entity on the MS 100 side of the wireless system.

The CDU 120A of the MS 100 may apply the same mechanisms that are applied on the network side by the CDU 30A, namely: (a) compress on a per packet basis, using the compressed/not compressed indicator; (b) use a compression dictionary, common or otherwise; (c) guarantee no expansion of the output packet over the size of the original packet; (d) provide algorithm flexibility and the use of a menu or list of available compression algorithms; and (e) provide data processing savings.

In addition, if the application (i.e., the source of the uplink packets) is one that is resident or embedded in the MS 100, the CDU 120A can obtain direct knowledge as to whether the original packet is already compressed by communicating with the application. In this case the CDU 120A need not execute an algorithm to detect if the original packet is already compressed.

In any case, the CDU 30A of the GGSN 30 decompresses an arriving uplink packet, or does not decompress the arriving uplink data packet, based on signalling attached to or otherwise associated with the packet.

Referring to FIG. 3, a description is now made of a method for performing data compression in the wireless communications system 5. Note that this method is described in the context of the downlink transmission, although it is to a great extent symmetrical with respect to the uplink.

At Step A an original data packet is received at a network node (in the preferred embodiment the GGSN 30) that located between the PDN 35 and IP network 36 of the wireless communications system 5.

At Step B the original data packet is compressed at the network node and, at Step C, the compressed original data packet is transmitted through the IP network 36 and through a wireless link to the mobile station 100.

Compressing the original data packet may use a data compression algorithm that is specified in a subscriber profile associated with the mobile station 100, or it may use a data compression algorithm that is specified during a signaling exchange with the mobile station.

Compressing the original data packet includes first examining the original data packet to determine if it is compressible, and if it is not, transmitting the original data packet to the mobile station 100 without compressing the original data packet. The packet can be examined by detecting explicit information carried by the data packet, and/or by attempting to compress the original data packet for determining if the original data packet is compressible.

In one embodiment the method preferably adds an explicit compressed/uncompressed indicator to the transmitted data packet. In this case the method may adjust a size of the data packet to accommodate the explicit compressed/uncompressed indicator. Alternatively, the method can use an implicit compressed/uncompressed indicator in the data packet.

In an alternate embodiment compressing the original data packet can include first receiving an indication from the mobile station that the original data packet is compressible.

The method can further include detecting information carried by the data packet and, for certain types of data packets, the compressor maintains state information concerning content carried by the data packets. In this case compressing or not compressing subsequently received original data packets is performed at least partially in accordance with the state information.

While described in the context of the GGSN 30, it should be realized that in other wireless communications systems a corresponding network node may be referred to by some other name. In any embodiment in accordance with an aspect of this invention it is preferred that the compression/decompression of subscriber packet data be performed in a network node located between the external packet data network, such as the PDN 35, and the IP network 36. In this manner the various benefits discussed above can be realized, such as the reduction in required bandwidth of the IP network 36 and downstream components (i.e., those components in the direction of the MS 100.)

The teachings of this invention may be implemented on a proprietary or a non-proprietary basis between the MS 100 and the GGSN 30 in the home network of the MS 100, with no standardization proceedings being required. When the GGSN 30 is not in the home network, i.e., when the MS 100 is roaming, a suitable handshake mechanism can be employed to determine if the GGSN 30 supports the compression/decompression operations in accordance with this invention and, if it does, the handshaking can further establish the compression algorithm(s) to be used, the nature of the compressed/uncompressed indicator and whether same is to be implicit or explicit, which MIME types are compressed and which are not, and any other required information for enabling the CDU 120A of the MS 100 to operate with the CDU 30A of the GGSN 30 in the roamed-to network. One suitable, but non-limiting handshake mechanism for use with Proprietary Features, that is described in detail below with reference to FIGS. 4-28, employs a PDP Context Activation message with a special Access Point Name (APN) message information element. Additional signalling, if required, can be carried (transparently) using Packet Data Units (PDUs) between the involved Network Nodes or Network Elements (NEs).

Additionally, MS subscriber information may be obtained by the roamed-to network from the home network of the MS 100, and some of this subscriber information can be used in place of active signaling or handshaking. For example, the compression algorithm(s) supported by the MS 100 can be ascertained from the subscriber information, and only if the roamed-to CDU 30A does not support the compression algorithm(s) may it be necessary to signal the MS 100 to negotiate the use of another compression algorithm.

In these various cases one or more compression algorithms may be value-added features where, for example, a subscriber selects, and is charged additionally for, a particular compression algorithm to be used in lieu of a standard compression algorithm offered by the network operator.

It should be realized that the data compression/decompression methods and apparatus described above may co-exist with other data compression/decompression methods and apparatus in the same wireless system.

It should be further realized that these teachings enable the MS 100 to connect to and receive data packets, such as text or video data packets, from an Internet 70 server that does not itself provide compressed data packets, and yet the benefits of compression as discussed above can still be realized.

In the preferred embodiment the CDU 30A of the GGSN 30 and the CDU 120A of the MS 100 can systematically perform data compression/decompression without negotiation, based simply on a pre-stored subscriber profile in the home network that also specifies the MS 100 data compression capabilities, parameters and functionality.

Having thus described the first aspect of this invention, a description is now provided of the handshake mechanism for Proprietary Features that was referred to above. In the ensuing description a Network Element (NE) may be, by example, the GGSN 30 or the SGSN 38 or the MS 100.

By way of introduction, when NE A (e.g., MS 100) wants to send proprietary signaling to some other NE B, it first determines if B is capable of interpreting the signaling. NE A does this by sending a PDP Context Activation message with a special value for the Access Point Name (APN) message information element. A rejection by B is interpreted as a lack of capability at B. If B responds positively, then A receives the confirmation of the Proprietary Feature support by B. If desired, the special PDP context can subsequently be used for exchanging Proprietary Feature related information. This invention uses a pre-defined value of APN for indicating a Proprietary Feature. The APN is only used as a parameter to carry the indication of a Proprietary Feature. In addition to APN, any other field in the messages for PDP context activation may carry the indication. However, the use of the APN field is preferred because its substantial length (257 bytes) provides significant space for carrying other signaling information besides the Proprietary Feature indication. Also, since the format of APN is specified to be characters, it is capable of carrying any coded value.

This aspect of the invention is described by way of examples of some Proprietary Features. Various cases are possible such as, by example: A is the MS 100, B is the SGSN 38; A is the SGSN 38, B is the GGSN 30; A is the SGSN, B is the MS 100; A is the GGSN, B is the SGSN 38; and A is the MS 100, B is the GGSN 30.

The special PDP context signaling is preferably exchanged before any other PDP context activation. As one non-limiting example, the signaling can be exchanged after GPRS Attach and Routing Area Update procedures (i.e., PDP Context Activation is not always required).

The method discussed below provide a number of advantages. Firstly, the method is applicable irrespective of the open interfaces and their future enhancements, as the method only requires the PDP context activation procedure. Second, it is not necessary to create and manage an actual PDP context for enabling the proprietary feature. Thirdly, there is no limitation on the size and the number of the proprietary signalling. This is because after successful activation of the special PDP context, the signalling can be carried in as many Packet Data Units (PDUs) as needed. Furthermore, the method is applicable to all of these cases of MS 100 and network feature inter-working: MS 100 and SGSN 38; MS 100 and GGSN 30; MS 100, SGSN 38 and GGSN 30. In the latter case of the MS 100, SGSN 38 and GGSN 30, if one NE doesn't support the method, the method can proceed with other two NEs. The use of the method enables a proprietary feature capability for all the NEs and the MS 100 to be exchanged with one another. What follows is a description of an embodiment of this aspect of the invention, followed by a number examples of how this aspect of the invention can be implemented.

Assume that the MS 100 invokes the network by sending a designated APN to the SGSN 38 in the PDP Context Activation Request message, referred to herein as a special PDP context activation. As was noted above, the APN field is used because it has a length of 257 bytes, and thus makes it possible to carry more signalling information than the other fields of the PDP Context Activation messages. If the SGSN 38 also supports the Proprietary Feature, it recognizes the designated APN. The SGSN 38 then sends a Create PDP Context Request, with the APN, to the GGSN 30. If the GGSN 30 also supports the Proprietary Feature, it recognizes the designated APN and invokes the Proprietary Feature for the MS 100. The GGSN 30 and SGSN 38 acknowledge the invocation of the Proprietary Feature by then completing the PDP Context Activation signalling.

The standardized acknowledgment messages (Create PDP Context Accept and Activate PDP Context Response) do not contain the APN. As the SGSN 38 and GGSN 30 have already recognized the Proprietary Feature capability from the MS 100 and SGSN 38 respectively, they may send a proprietary extension in the acknowledgment messages without creating a problem. It is also to be noted that the presence of APN in the response messages is optional, and is only needed when a two-way handshake is needed for enabling a Proprietary Feature. One example may be a negotiation of parameters related to the data compression embodiment described above.

If enabling of a Proprietary Feature is required only between the MS 100 and the SGSN 38, the special PDP Context Activation signalling can be reduced to only those messages between the MS 100 and the SGSN 38.

If the MS 100 sends the designated APN to the SGSN 38, which does not support the Proprietary Feature, the SGSN 38 simply rejects the PDP Context Activation. Similarly, if the GGSN 30 does not support the Proprietary Feature, it also rejects the PDP Context Creation request.

The PDP Context Activation signalling can be exchanged without actually creating any context within the MS 100, SGSN 38 and GGSN 30. All of these elements know that the designated APN is used to exchange information regarding a Proprietary Feature, and they are only required to exchange the information without creating any context. When the MS 100 needs to initiate a regular packet session, it performs a normal PDP Context Activation procedure, and uses an APN which connects it to the same GGSN 30 that it contacted for the special PDP context activation (refer to FIG. 5). This option limits the dynamic GGSN 30 allocation capability of the GPRS network. To overcome this limitation, it is possible to use the concept of Primary and Secondary PDP context. The Primary PDP context is activated for the special PDP context, and the Secondary PDP context is activated for a regular data session (refer to FIG. 6).

A first application of particular interest to this invention involves data packet payload compression between the SGSN 38 and MS 100. The example of the use of the GGSN 30 for the payload compression could be used as well. As was noted above, existing GSM GPRS protocols offer payload compression by using V.42bis and V.44 standards. For GSM GPRS, a vendor may desire to use a proprietary compression algorithm, which can deliver better performance than the standardized compression algorithms. Moreover, existing UMTS GPRS protocols do not offer any payload compression. For UMTS GPRS, a certain vendor may desire to provide a payload compression mechanism between the MS 100 and SGSN 38, or between the MS 100 and the GGSN 30, as was described previously.

In this particular example a vendor implements a proprietary compression/decompression algorithm between the MS 100 and SGSN 38. The MS 100 uses the mechanism described above to determine that the SGSN 38 supports the proprietary compression. The teachings of this aspect of the invention not only provide a technique for enabling an improved proprietary payload compression mechanism, but also provide a mechanism to select a compression algorithm. The signalling exchange is shown in FIG. 7.

A second application that is also of interest to this invention involves data packet header compression using the PDP Context Information. Normally a data packet header compression scheme first exchanges full headers to build the compression/decompression context. Since it is typically beneficial if the compression begins immediately with the first data packet. In one approach a header compression technique adds the IP address from the PDP Context in the header compression context. Thus, the IP address is not sent, even in the first data packet.

If the MS 100 is using this header compression scheme, it needs to inform the SGSN 38 to enable the scheme. This aspect of the invention can be used for this purpose. The MS 100 uses this invention as illustrated in FIG. 8 to inform the SGSN 38 that the MS 100 will send data packets without any source IP address, and the SGSN 38 is required then to supply the IP address from the PDP context. It further allows MS 100 to inform the SGSN 38 whether this mechanism will be used for all of the packets, or only for the first packet such as the TCP SYN packet for opening a connection. One reason why only the first packet is mentioned is that, after the exchange of the first packet, the decompressor of the CDU 30A, 120A can build the decompression state for the IP address. Compressing a TCP SYN packet aids in transporting SYN over the air interface with fewer radio frames and more robust channel coding. This tends to decrease the connection set-up time for a session.

A third application example of particular interest involves downloading a desired dictionary for use by the compression algorithm. In this example it is assumed that a compression mechanism, e.g., the CDU 30A or 120A, uses a dictionary to compress messages or text between the MS 100 and the SGSN 38, or the GGSN 30 as discussed above. In general, dictionary-based compression schemes provide good compression efficiency. In a dictionary-based mechanism, the compressor of the CDU 30A, 120A replaces the contents of a data packet with indices in the dictionary. The decompressor restores the original content by indexing in the dictionary using the received indices. As should be apparent, the compressor and decompressor need to use the same dictionary.

This aspect of the invention provides further enhancements to the dictionary-based compression technique. The invention allows the MS 100 to use any dictionary so long as it informs the SGSN 38 to download the dictionary from some location. This provides a tremendous flexibility in the dictionary-based compression. The SGSN 38 does not need to be updated for all the possible dictionaries used by all the different versions of MS 100s. Also, the MS 100 can maintain a customized dictionary based on its frequent use. This application example may be combined with the first application example given above, and a combined APN field can be send in this case. This example is illustrated in FIG. 9.

While the first three application examples given above concern most particularly the compression/decompression functionality, a fourth application example involves coordination for retransmission requests. Thus, it should be realized that this aspect of the invention is not limited for use only in data compression/decompression applications and methods, as will be made apparent below.

More specifically, there is a proposed mechanism for increasing TCP throughput by re-transmitting lost data packets from an internal buffer at the link layer. This technique has been referred to as Accelerated Retransmission. In operation, the RLC/MAC layer determines a packet loss and sends a retransmission request to the buffer in the SNDCP, where unacknowledged TCP data packets are buffered. The SNDCP retransmits the lost packet from the buffer.

The procedure for detecting a packet loss and sending a retransmission request can be initiated either by the MS 100 or by the wireless network 5 for downlink/uplink packet flow. If the MS 100 is served by the SGSN 38, which does not support this feature, the MS 100 should in this case send a retransmission request. However, if the MS 100 is served by a SGSN 38 that does support this feature it is more straightforward for the RLC/MAC in the BSS 40 to send the retransmission request.

As can be appreciated, there is a need to provide for the coordination of the retransmission request based on the feature support of the network 5. This aspect of invention provides such coordination as illustrated in FIG. 10. The MS 100 first checks with the SGSN 38 concerning support for the feature. If the SGSN 38 supports the feature, the MS 100 disables its mechanism for sending retransmission requests to the SGSN 38.

Other cases of MS 100 and network 5 interaction may exist than only those discussed above. More specifically, a particular case was described above where the Proprietary Feature interaction is required between the MS 100, the SGSN 38 and the GGSN 30; and the MS 100 initiates the special PDP context activation. However, these teachings are not limited to this one specific case, and other cases of interactions and initiations are now described.

(A) With regard to interaction among the MS 100, SGSN 38 and GGSN 30, the assumption is that the Proprietary Feature interaction is required among the MS 100, SGSN 38 and GGSN 30.

Figure 11:
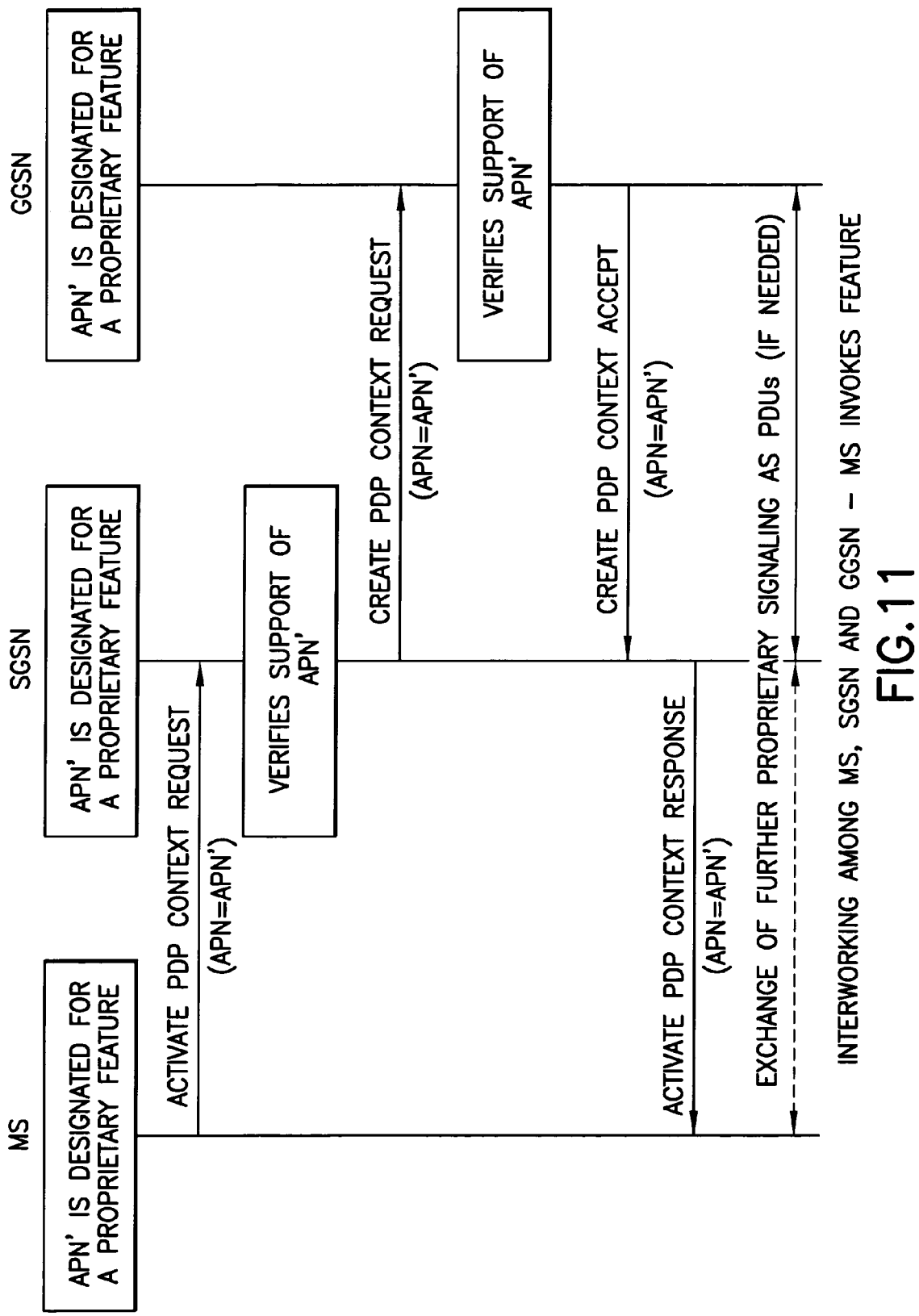

In a first case the MS 100 initiates the transaction, as described above. A further development is now described wherein the APN field is not large enough to carry the Proprietary Feature signalling and requires further interaction to complete the signalling, or a two-way handshaking mechanism is desired. In either case the MS 100, SGSN 38 and GGSN 30 exchange proprietary signalling using PDUs. This embodiment is illustrated in FIG. 11.

Figure 4:
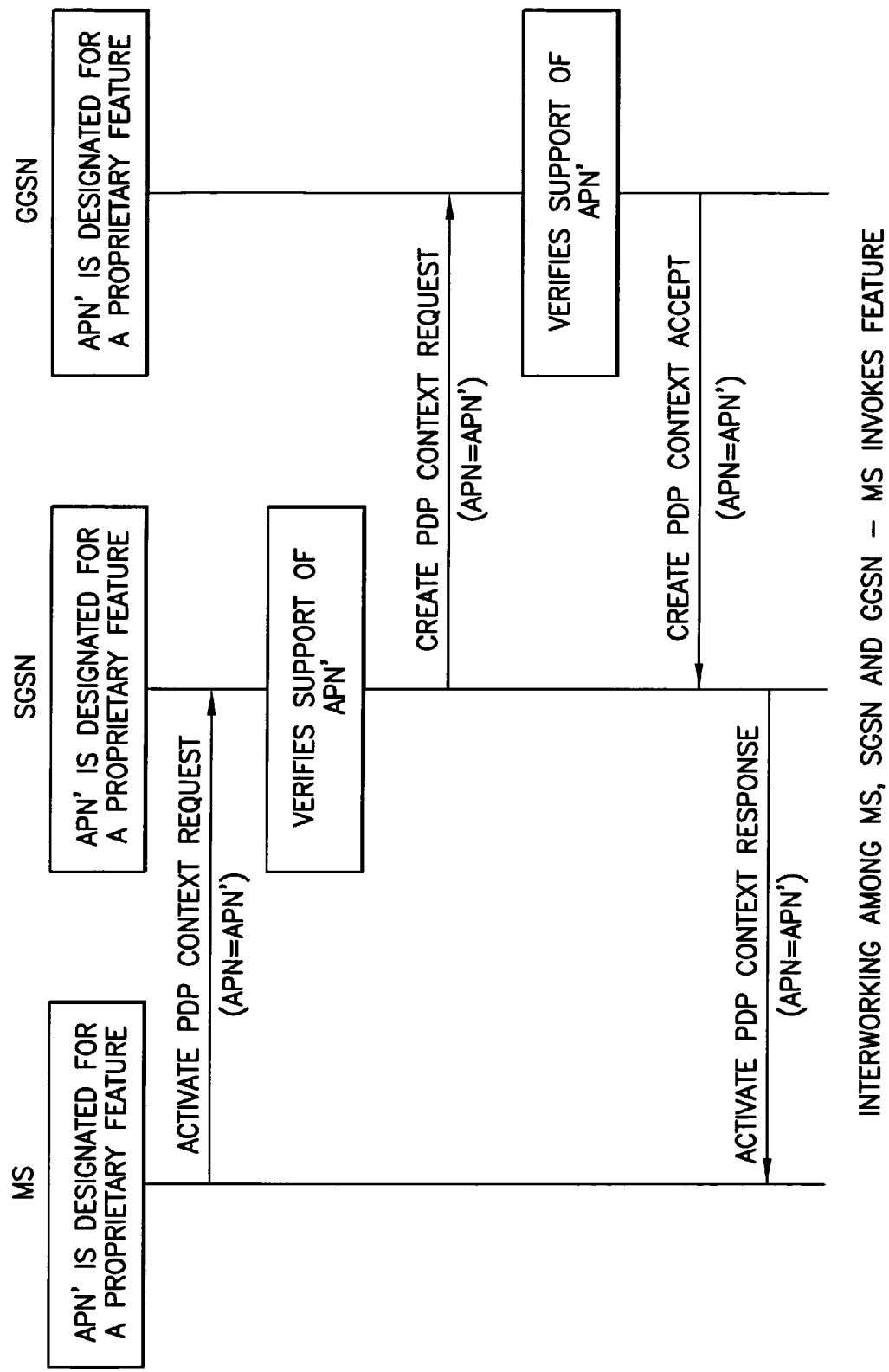
Figure 12:
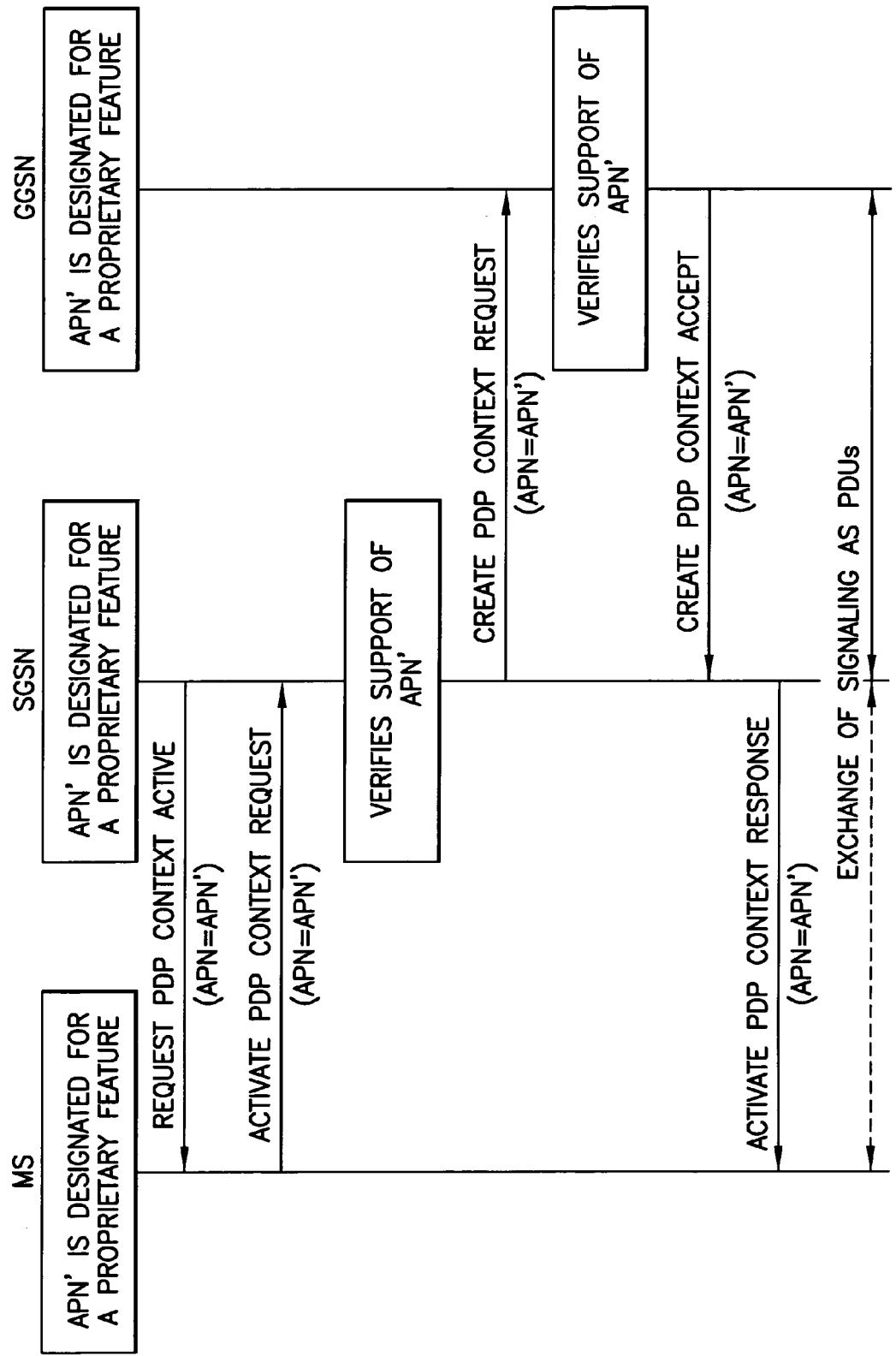

In a second case the SGSN 38 initiates the invocation of Proprietary Feature by executing Network Initiated PDP Context Activation, with the designated APN in the Request PDP Context Activation message to the MS 100. If the MS 100 supports the Proprietary Feature, it recognizes the designated APN and proceeds as illustrated in FIG. 4. The complete procedure is illustrated in FIG. 12.

If the MS 100 does not support the Proprietary Feature, it will either reject or proceed with a different APN. In either case, the PDP Context Activation Request is rejected by the SGSN 38.

Figure 13:
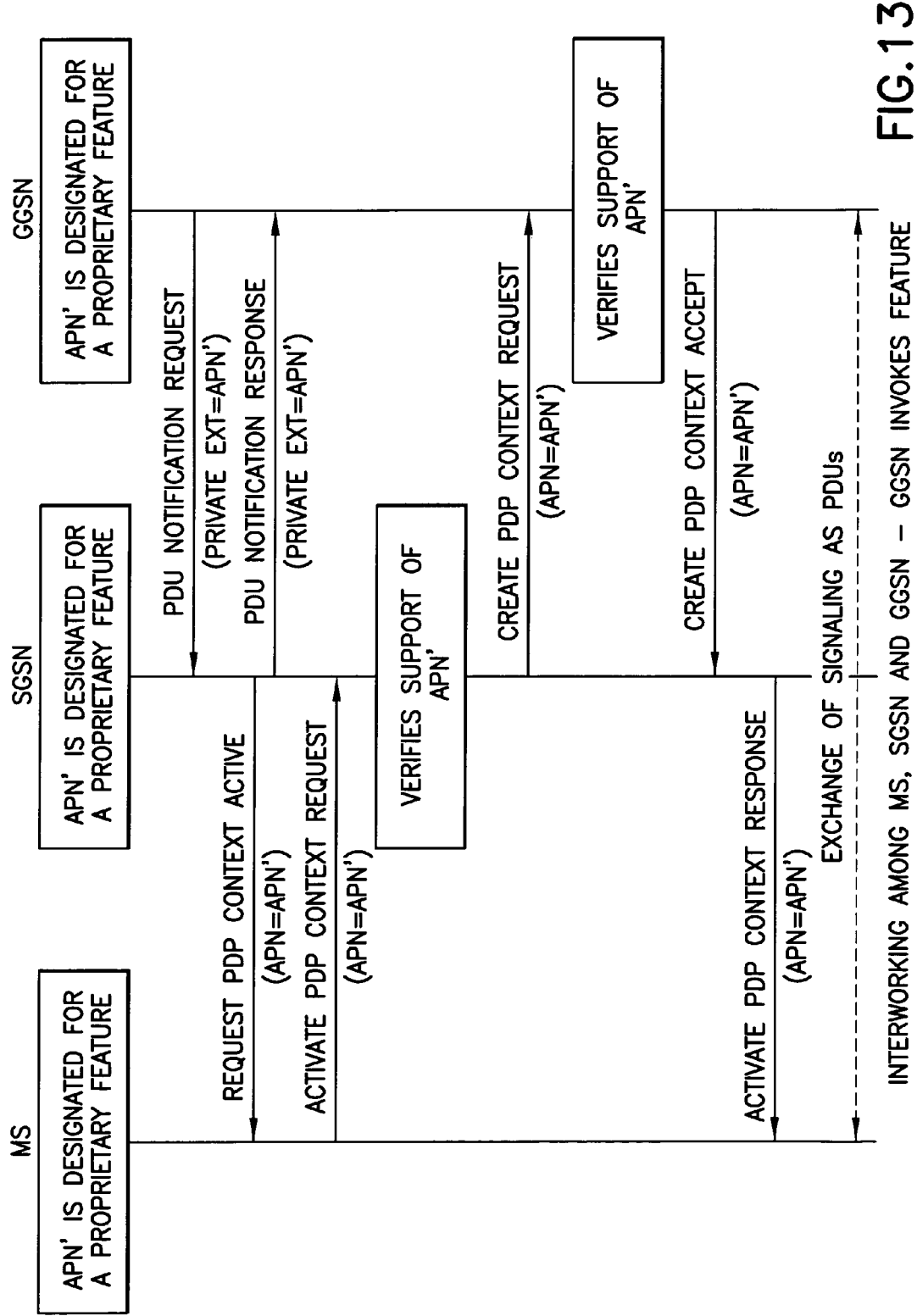

In a third case the GGSN 30 initiates the invocation of Proprietary Feature by emulating that the PDUs have arrived from the external network (PDN 35), as illustrated in FIG. 13. The GGSN 30 sends the PDU Notification Request message to the SGSN 38 to initiate Network Initiated PDP Context Activation. The following are two techniques for sending the APN in the PDU Notification Request message:

First, the GGSN 30 may send the designated APN in the Private Extension field of the PDU Notification Request. The SGSN 38 extracts the APN and uses it when invoking the Network Initiated PDP Context Activation. The remainder of the procedure is same as described above. This method does not require any standardization changes.

Second, the PDU Notification Request message is enhanced to include the APN as an optional field. The GGSN 30 sends the designated APN using the APN field. The remainder of the procedure is same as in the option described above. This method does require standardization changes.

(B) For the case of an interaction between the MS 100 and the SGSN 38, the assumption is that the Proprietary Feature interaction is required only between MS 100 and SGSN 38. Also, it is assumed that the Proprietary Feature is not supported on the GGSN 30.

Figure 14:
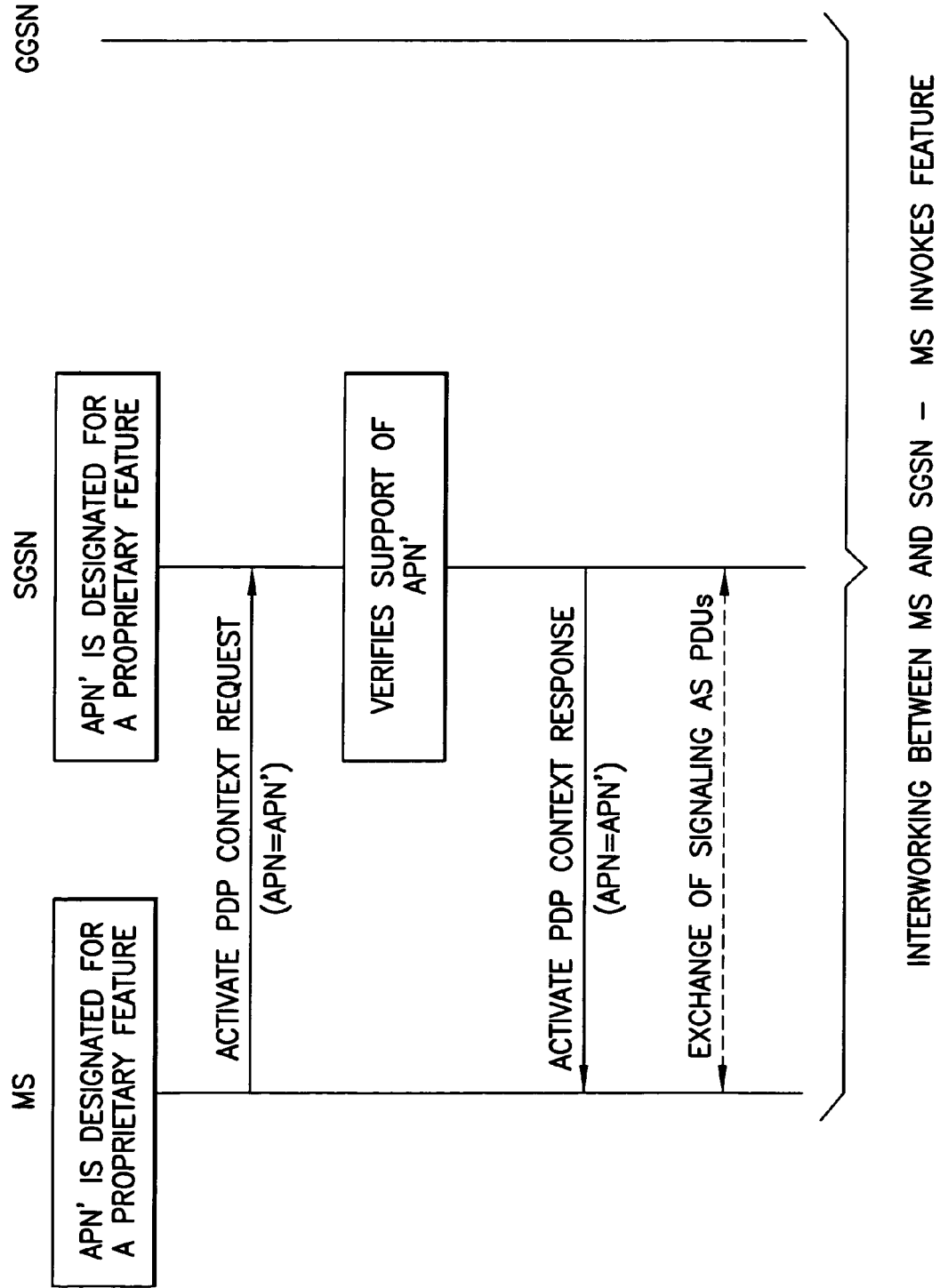

For the case where the MS 100 initiates the MS 100 invokes the network 5 by sending a designated APN to the SGSN 38 in the PDP Context Activation Request message. If the SGSN 38 also supports the Proprietary Feature, it recognizes the designated APN. The SGSN 38 also recognizes that it does not need to involve GGSN 30 for this special PDP Context. The SGSN 38 acknowledges the invocation of the Proprietary Feature by sending the PDP Context Activation Accept message, with the same APN. If further inter-working is required a special PDP context is created in the SGSN 38. The MS 100 and SGSN 38 exchange proprietary signalling using PDUs. This case is illustrated in FIG. 14.

If the MS 100 sends the designated APN to the SGSN 38, which does not support the Proprietary Feature, the SGSN 38 simply rejects the PDP context activation.

Figure 15:
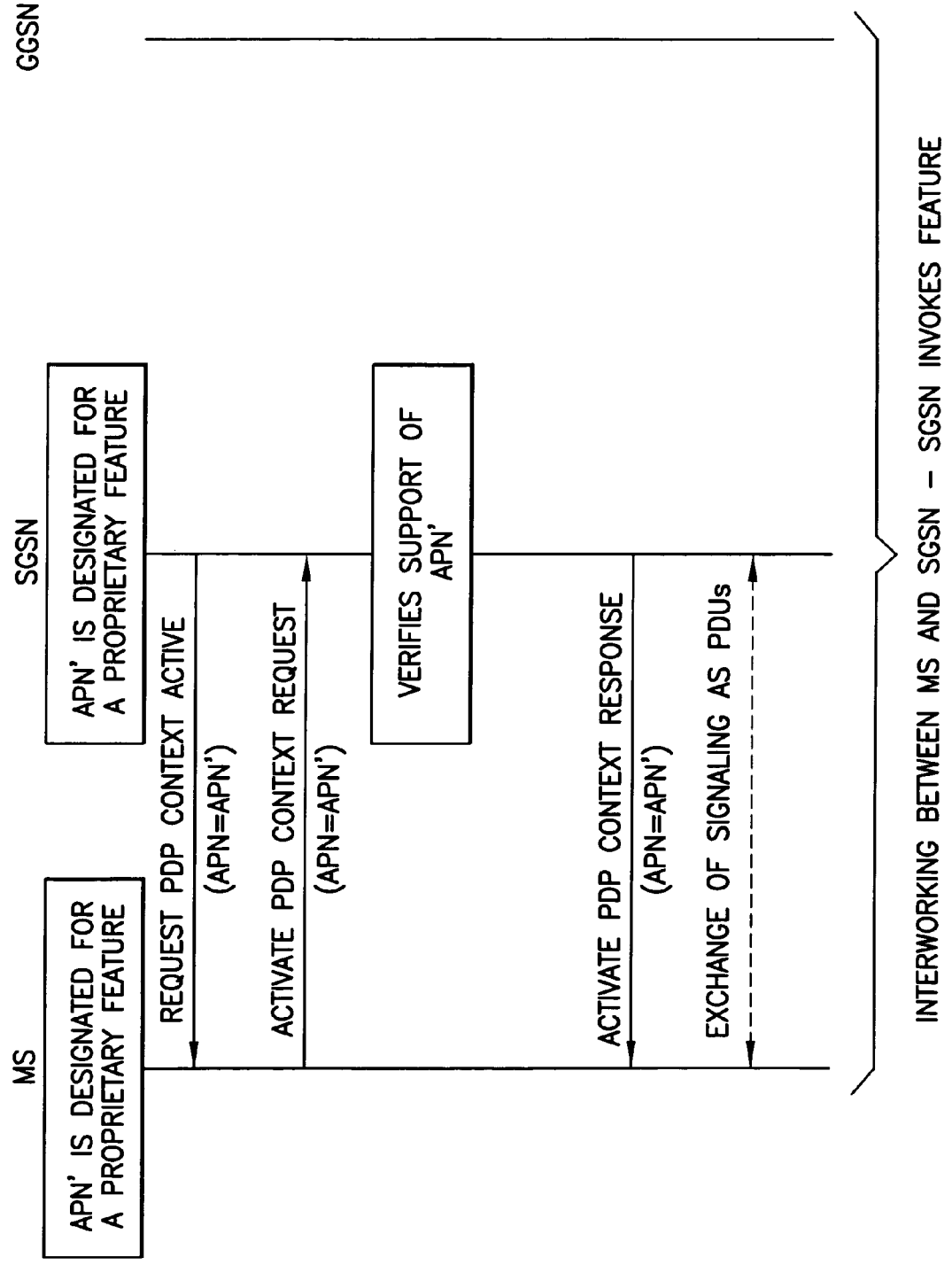

When the SGSN initiates the invocation of a Proprietary Feature by executing Network Initiated PDP Context Activation, as illustrated in FIG. 15, the SGSN 38 sends the designated APN in the Request PDP Context Activation message to the MS 100. If the MS 100 supports the Proprietary Feature, it recognizes the designated APN and proceeds as illustrated in FIG. 14.

If the MS 100 does not support the Proprietary Feature, it will either reject or proceed with a different APN. In both cases, its PDP Context Activation Request is rejected by the SGSN 38.

(C) Discussing now the case of an interaction between the MS 100 and the GGSN 30, the assumption is that the Proprietary Feature interaction is required only between the MS 100 and GGSN 30. The Proprietary Feature is not supported on the SGSN 38.

The designated APN or the Wild Card APN (see GSM 03.03 and 03.60/23.060) is provisioned as subscriber data in the Home Location Register (HLR). In this way, when the MS 100 requests the designated APN in PDP Context Activation procedure, the SGSN 38 allocates the GGSN 30 implied by the designated APN. The designated APN results in a routable address from the visiting SGSN 38 to the GGSN 30. The GSN nodes use private address space, which are not visible to the public Internet. They may use a Domain Name Server (DNS), internal to a PLMN or few PLMNs, for the name-to-address lookup. If an internal DNS is used, then the designated APN should be registered in the DNS.

Figure 16:
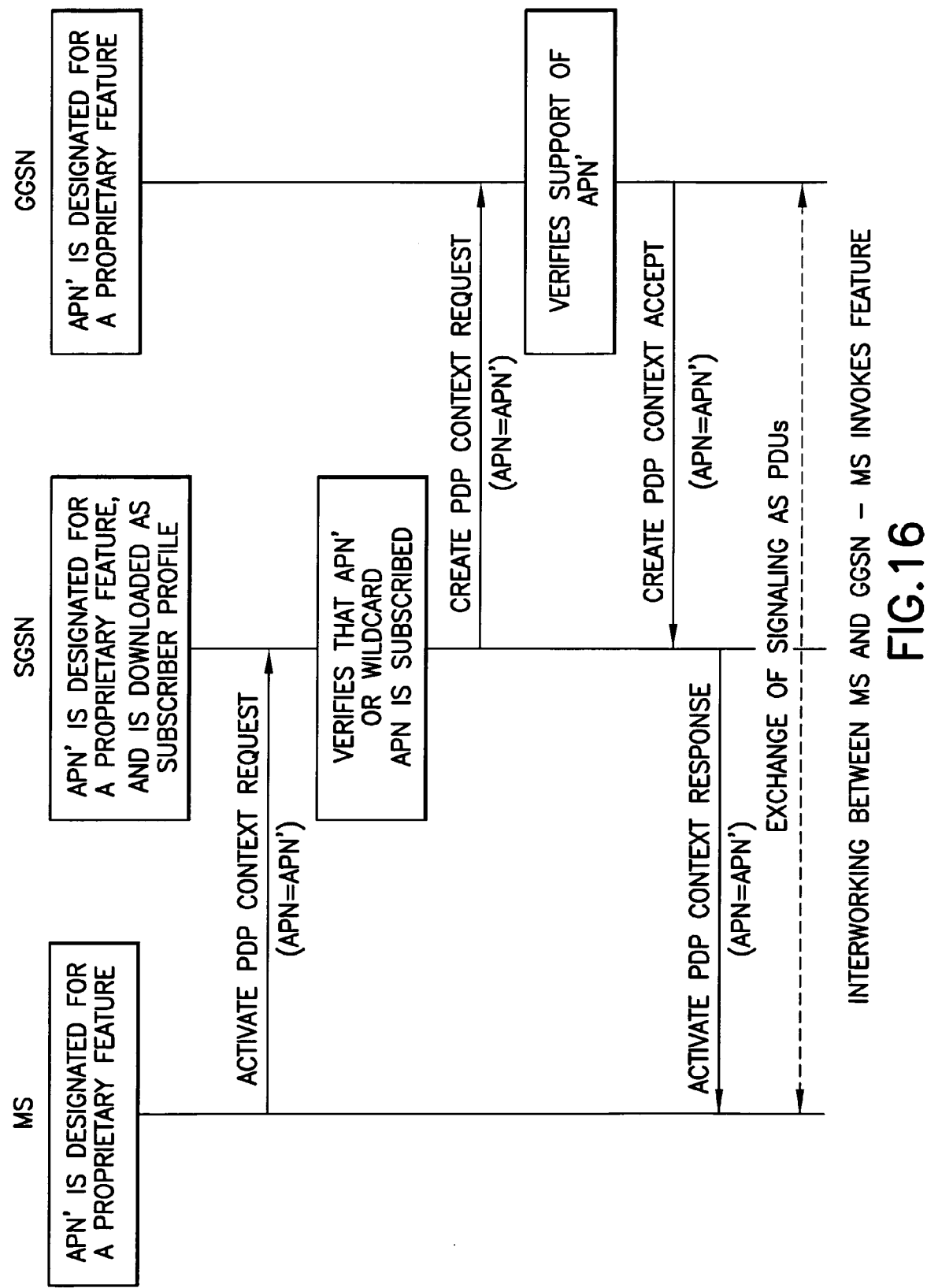

When the MS 100 initiates, an ALFIP capable MS 100 sends a designated APN to the SGSN 38 in the PDP Context Activation Request message. The SGSN 38, after recognizing that the requested APN is a subscribed APN, selects the GGSN 30 corresponding to this APN. The SGSn 38 then sends a Create PDP Context Request message toward the GGSN 30. The GGSN 30 sends back the Create PDP Context Accept message with the APN to the SGSN 38. After the completion of the procedure, the MS 100 and GGSN 30 may exchange proprietary signalling, using PDUs. The SGSN 38 transfers these PDUs transparently. This case is illustrated in FIG. 16.

Figure 17:
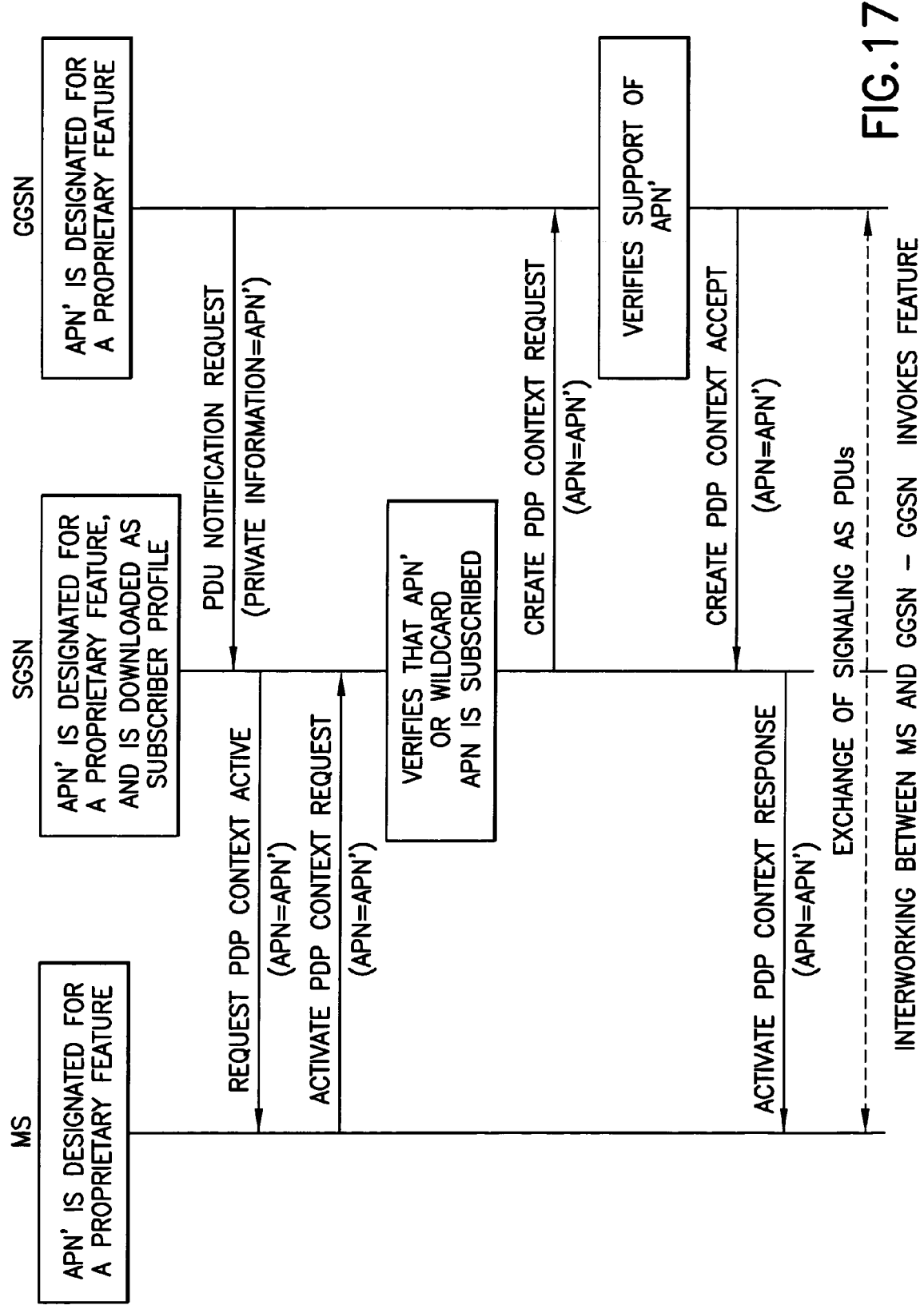

When the GGSN 30 initiates, it is noted that the GGSN 30 can only invoke a Proprietary Feature if the SGSN 38 is modified to copy the APN from the PDU Notification Information message to the Request PDP Context Activation message, as discussed previously. The GGSN 30 may not be able to invoke a Proprietary Feature, if the SGSN 38 is from other vendor. This case is illustrated in FIG. 17.

(D) For the case of an interaction between the SGSN 38 and the GGSN 30, the assumption is that the Proprietary Feature interaction is required only between SGSN 38 and GGSN 30 (and not also the MS 100).

Figure 18:
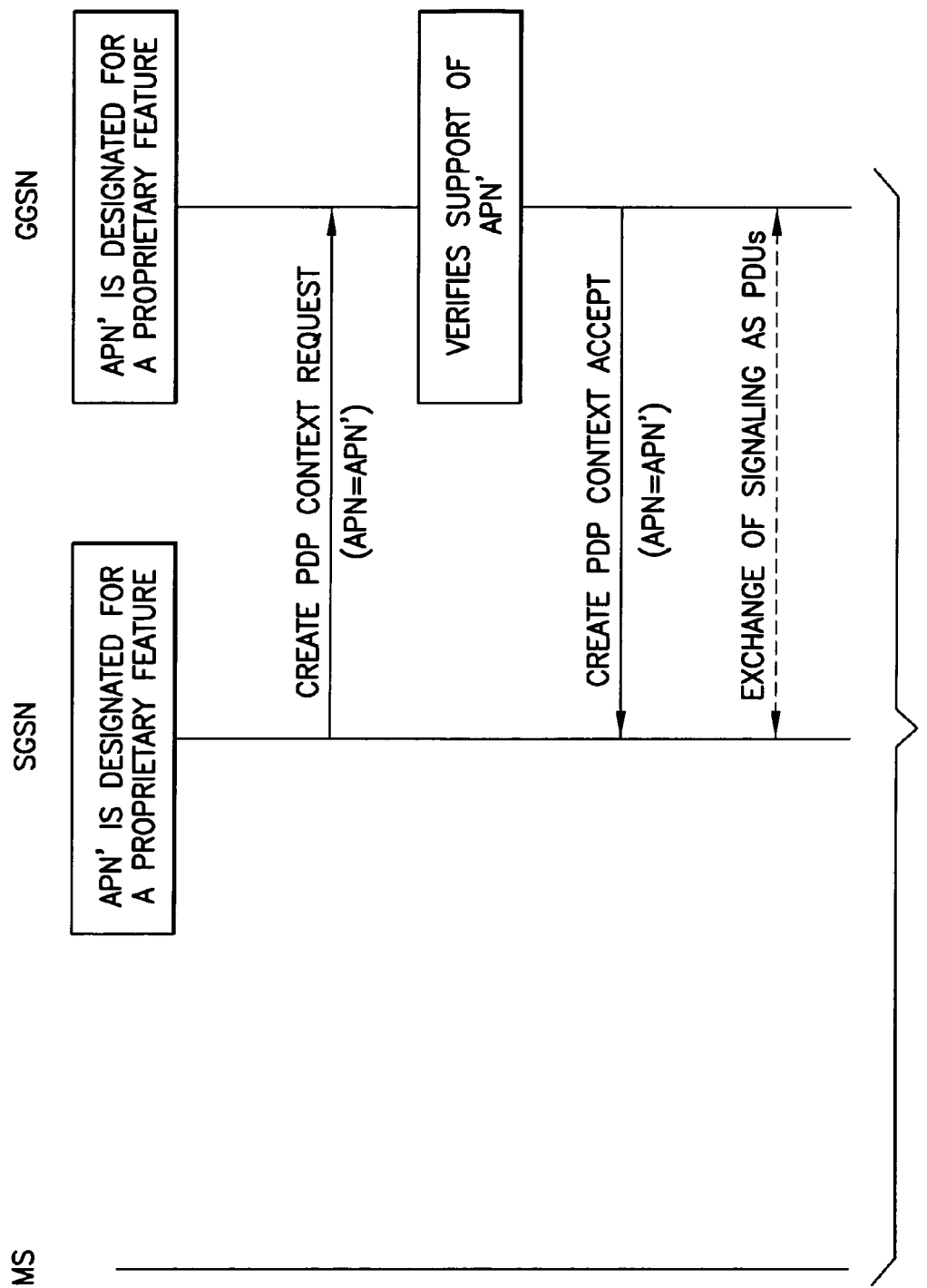

When the SGSN initiates, the SGSN 38 sends a Create PDP Context Request message with the designated APN toward the GGSN 30. The GGSN 30 sends back the Create PDP Context Accept message with the designated APN to the SGSN 38. After the completion of the procedure, the SGSN 38 and GGSN 30 may exchange proprietary signalling using PDUs. This case is illustrated in FIG. 18.

Figure 19:
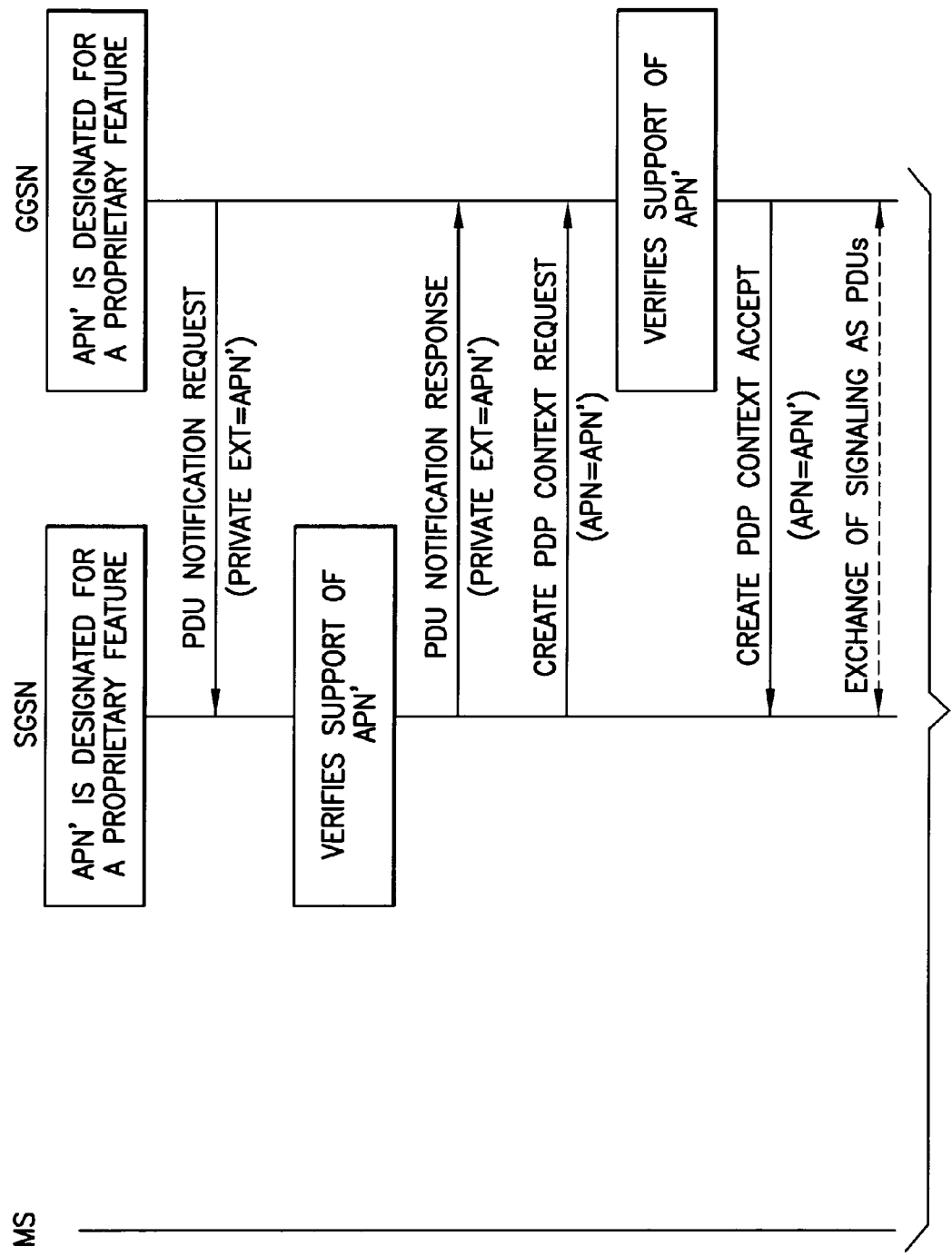

When the GGSN initiates, the GGSN 30 sends a PDU Notification Information message, with the designated APN in a Private Extension field, to the SGSN 38. The SGSN 38 replies with the Create PDP Context Request message, including the APN, toward the GGSN 30. The GGSN 30 sends back the Create PDP Context Accept message to the SGSN 38. After the completion of the procedure, the SGSN 38 and GGSN 30 may exchange proprietary signalling using PDUs. This case is illustrated in FIG. 19.

A discussion is now made of determining individual NE support in a multi-NE environment. The scenario discussed above regarding interaction among the MS 100, SGSN 38 and the GGSN 30 requires inter-working between more than two NEs. It is possible in this case that the invocation from the initiator may be accepted at one NE but rejected by the others. For example, assume that the MS 100 initiates a Proprietary Feature, that the SGSN 38 accepts it, and that the GGSN 30 rejects it. In such a case, the initiator may not totally drop the execution of the Proprietary Feature. It may instead initiate a different version of the Proprietary Feature, which can proceed with the NE that has accepted the invocation. What follows is thus a generic method that extends the method described above, and that aids an initiator in determining the list of NEs that have accepted the Proprietary Feature invocation.

Note that the method is not applicable to certain of the cases discussed above, since certain of these cases involve only two NEs. Also, the method can be extended with the same logic to an environment having more than three NEs.

The method uses the following rules:
(a) if a NE supports a Proprietary Feature, it appends the APN with its name; and
(b) if a NE does not support a Proprietary Feature, it relays the message without altering the APN.

In accordance with this method a set of APNs, instead of one APN, is associated with a Proprietary Feature. For example, for a Proprietary Feature X, one may have APNxMS, APNxSGSN, APNxGGSN, APNxMS/SGSN, APNXMS/GGSN, APNxSGSN/GGSN, etc. The set can be developed by using a base name suffixed by MS, SGSN, or GGSN, and their different combinations. The names of the individual NEs can be further abbreviated to conserve APN space, e.g., instead of APNxMS/SGSN/GGSN, one may use APNxMSG. This set of APNs is used according to the following algorithm:
(A) The initiator NE sends its APNx<name1> to the second NE
(B) The second NE, if it supports Proprietary Feature, sends APNx<name1><name2> to the third NE
  (B1) The third NE, if it supports the Proprietary Feature, sends back APNx<name1><name2><name3> to the second NE which also relays APNx<name1><name2><name3> to the first NE. In this way the first NE finds that both the second and third NE support the feature.
  (B2) The third NE, if does not support the Proprietary Feature, rejects the request. The second NE responds to the first NE by sending its APNx<name1><name2>. In this way the first NE discovers that only the second NE supports the feature; and the second NE discovers that only the first NE supports the feature.
(C) The second NE, if it does not support the Proprietary Feature, relays APNx<name1> to the third NE. In this way the third NE discovers which of the first two NEs support the Proprietary Feature.
  (C1) The third NE, if it supports the Proprietary Feature, accepts the request. This step is differentiated from step (B1) by recognizing that APNx<name1> and not APNx<name1><name2> is present in the request. The third NE responds by sending its APNx<name1><name3>. The second NE relays the response to the MS 100. In this way the first NE finds that only the third NE supports the feature.
  (C2) The third NE, if it does not support the Proprietary Feature, rejects the request. This rejection is relayed to the first NE.

The foregoing algorithm is further explained below for each of the scenarios discussed above for the case of the interaction between the MS 100, the SGSN 38 and the GGSN 30. The algorithm is explained for the cases where one of the NEs does not support a Proprietary Feature.

Figure 20:
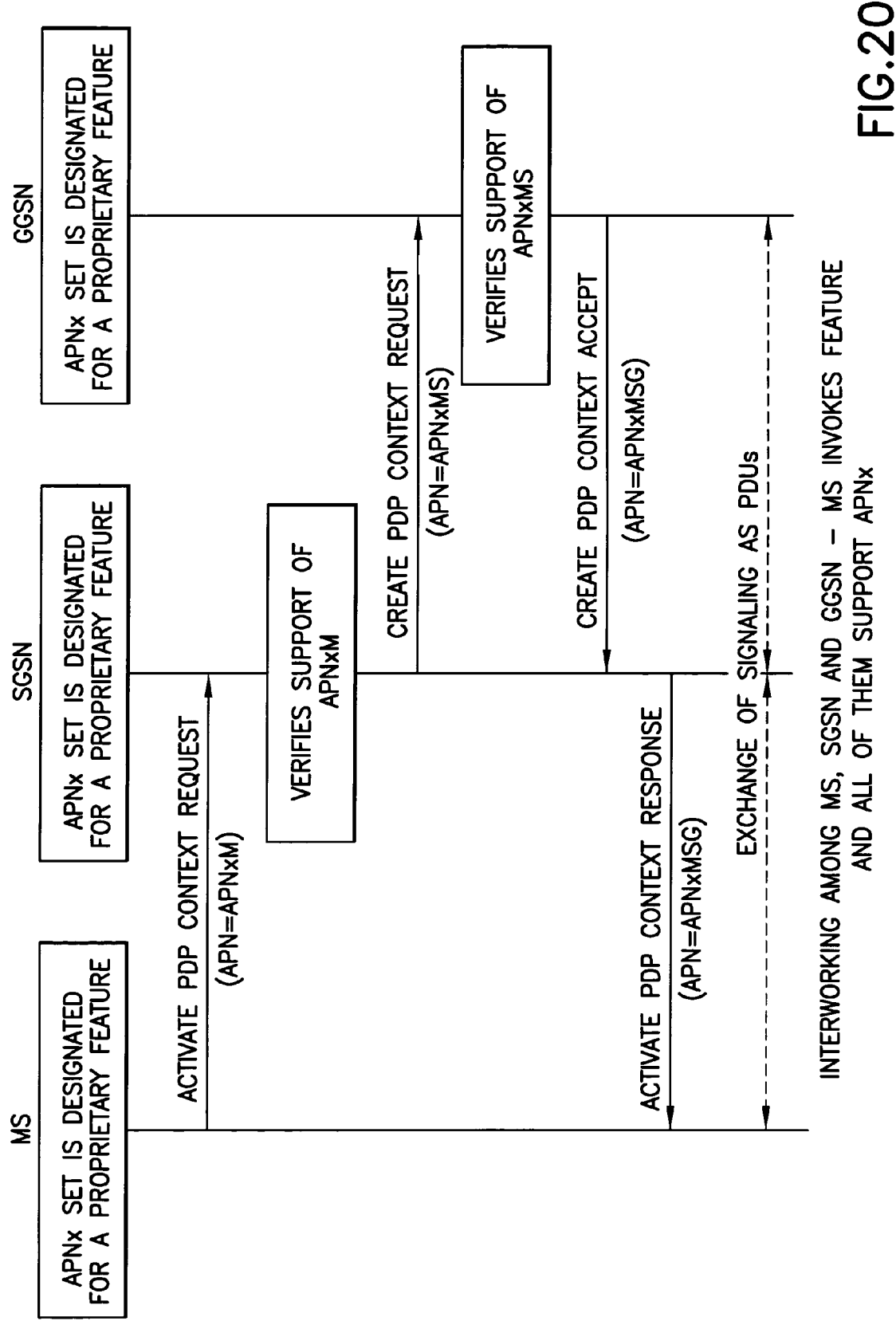

(A) Assume first that the MS 100 is the initiator, and the MS 100, SGSN 38 and GGSN 30 all support the Proprietary Feature. The MS 100 initiates the Proprietary Feature invocation assuming that both SGSN 38 and GGSN 30 support the Proprietary Feature. The MS 100 invokes the network by sending a designated APNxM to the SGSN 38 in the PDP Context Activation Request message. The SGSN 38 notes that the MS 100 supports the proprietary feature and sends the Create PDP Context Request, with APNxMS, to the GGSN 30. The GGSN 30, after accepting the request, places the APNxMSG in the reply. This case is illustrated in FIG. 20.

Figure 21:
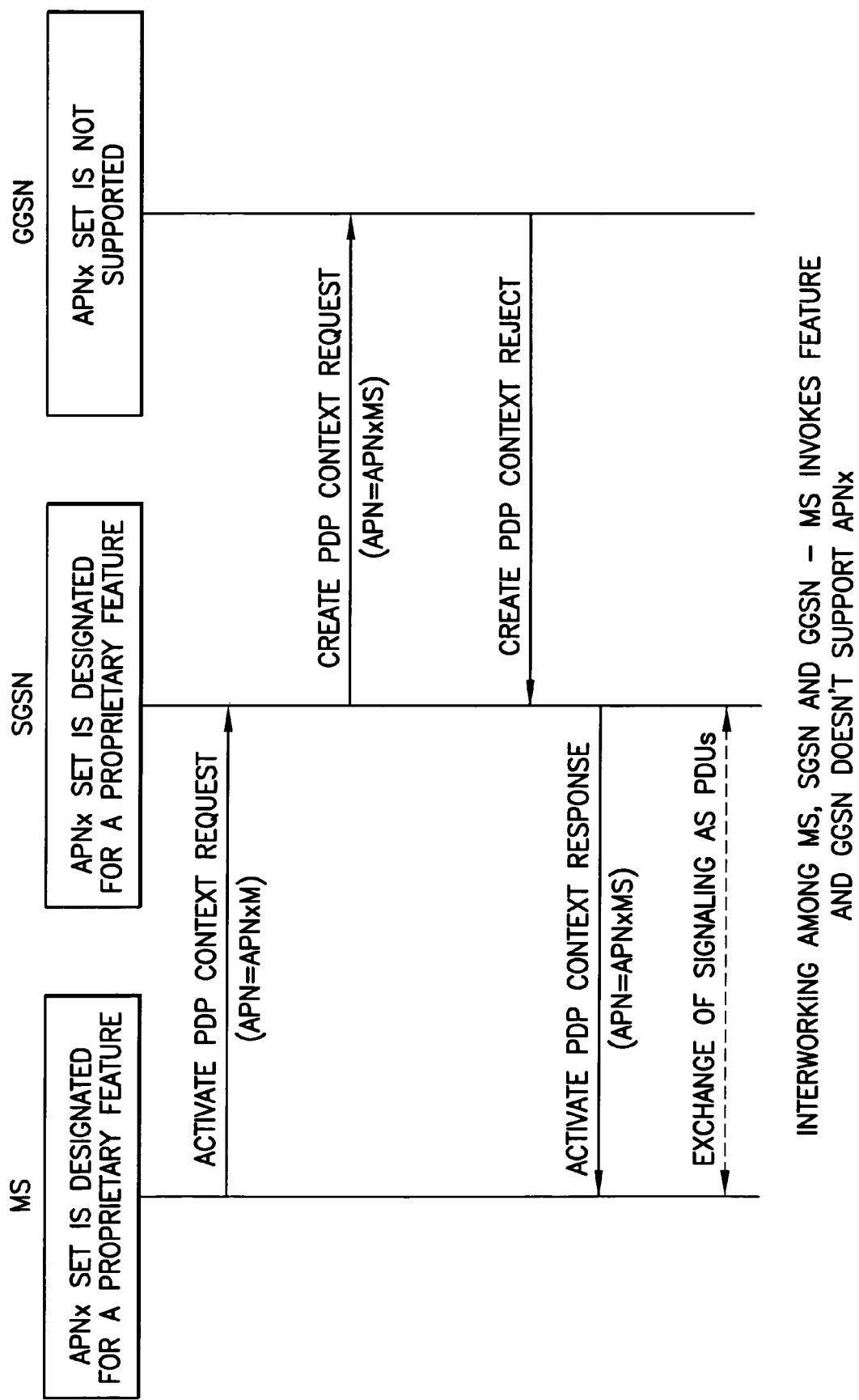

Assume now that the GGSN 30 does not support the Proprietary Feature. The MS 100 invokes the network by sending the designated APNxM to the SGSN 38 in the PDP Context Activation Request message. The SGSN 38 notes that the MS 100 supports the proprietary feature and sends the Create PDP Context Request, with APNxMS, to the GGSN 30. The GGSN 30 does not recognize the APN and sends the PDP Context Reject message to the SGSN 38. The SGSN 38 sends APNxMS to the MS 100. In this way, the MS 100 recognizes that only the SGSN 38 has accepted the invocation. This case is illustrated in FIG. 21.

Figure 22:
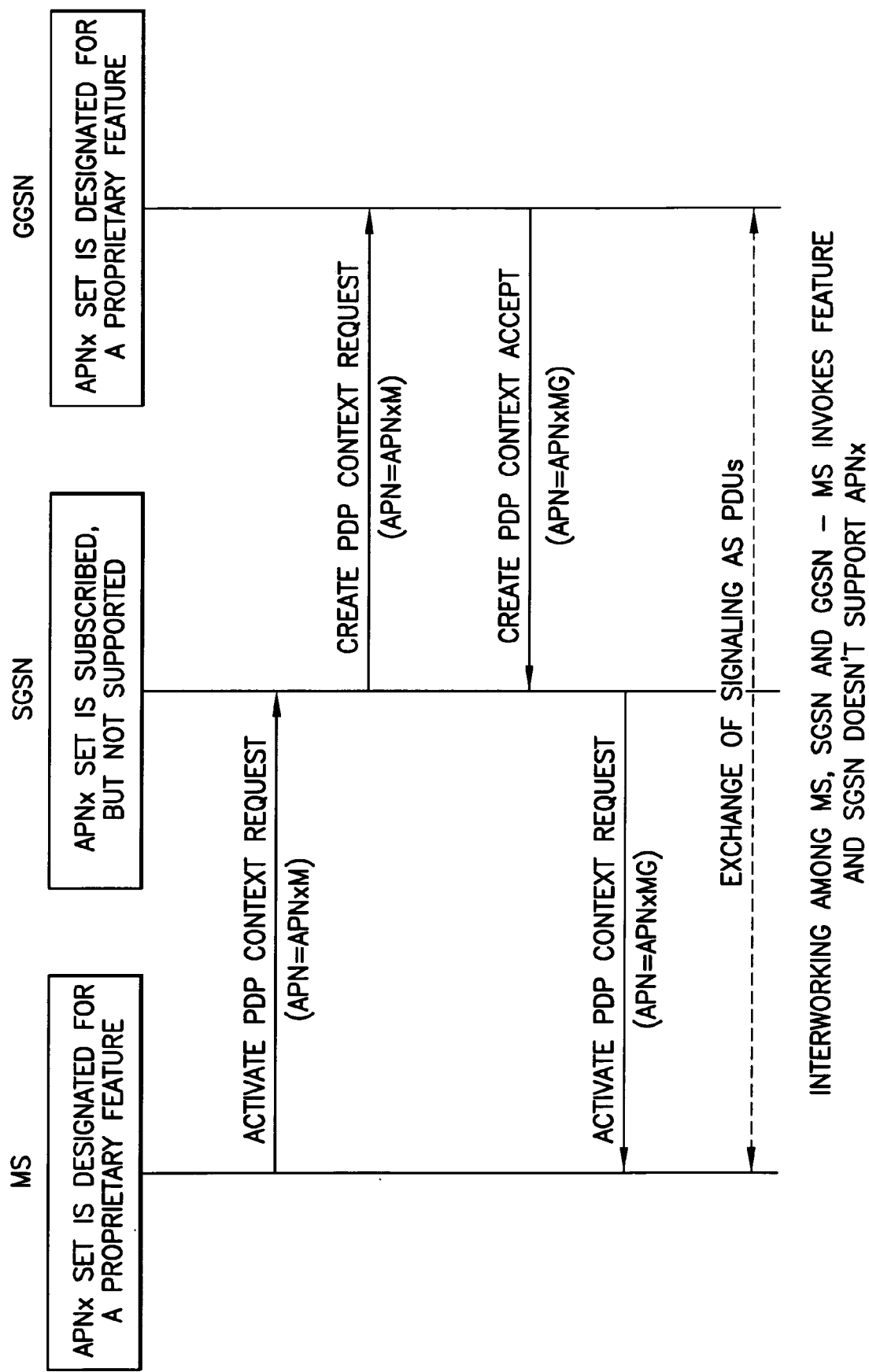

Assume now that the SGSN does not support the Proprietary Feature. This case requires the designated APNxM or the Wild Card APN (see GSM 03.03 and 03.60/23.060) provisioned as subscriber data in the HLR, as mentioned above. The SGSN 38 forwards the PDP context request to the GGSN 30 with APNxM. The GGSN 30, after accepting the request, puts APNxMG in the reply. In this way, the MS 100 recognizes that only the GGSN 30 supports the Proprietary Feature. This case is illustrated in FIG. 22.

Figure 23:
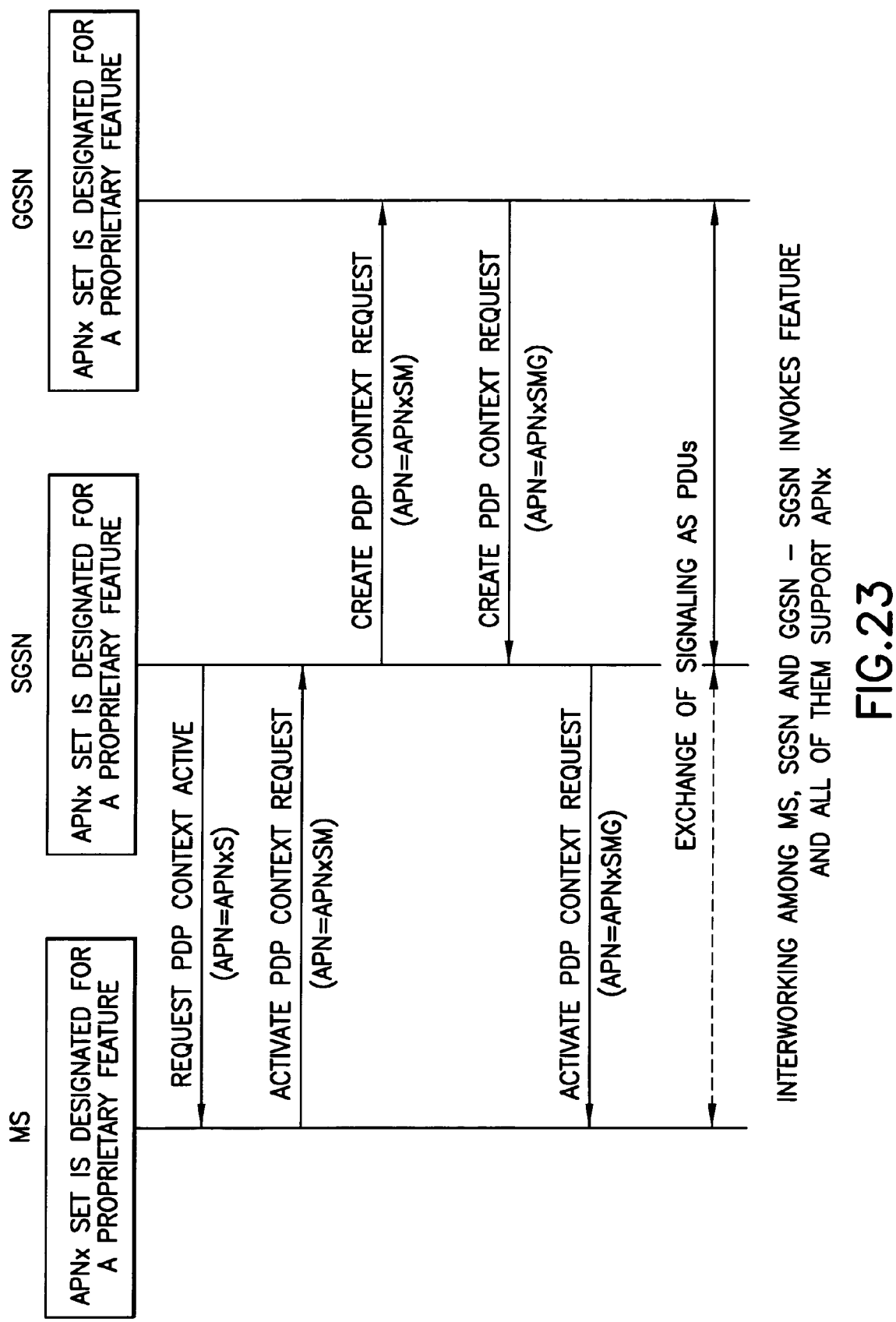

(B) Assume next that the SGSN 38 is the initiator, and that the MS 100, SGSN 38 and GGSN 30 support the Proprietary Feature. The SGSN 38 first sends the APNxS in the Request PDP Context Activation message to the MS 100. If the MS 100 supports the Proprietary Feature, it sends the PDP Context Activation Request to the SGSN 38 with APNxSM. In this way, the SGSN 38 discovers the support of the Proprietary Feature by the MS 100. The SGSN 38 then sends APNxSM to the GGSN 30 in the PDP Context Request message. This informs the GGSN 30 that both the MS 100 and SGSN 38 support the feature. The GGSN 30 sends a response with APNxSMG to the SGSN 38, which conveys it to the MS 100. The complete procedure is illustrated in FIG. 23.

Figure 24:
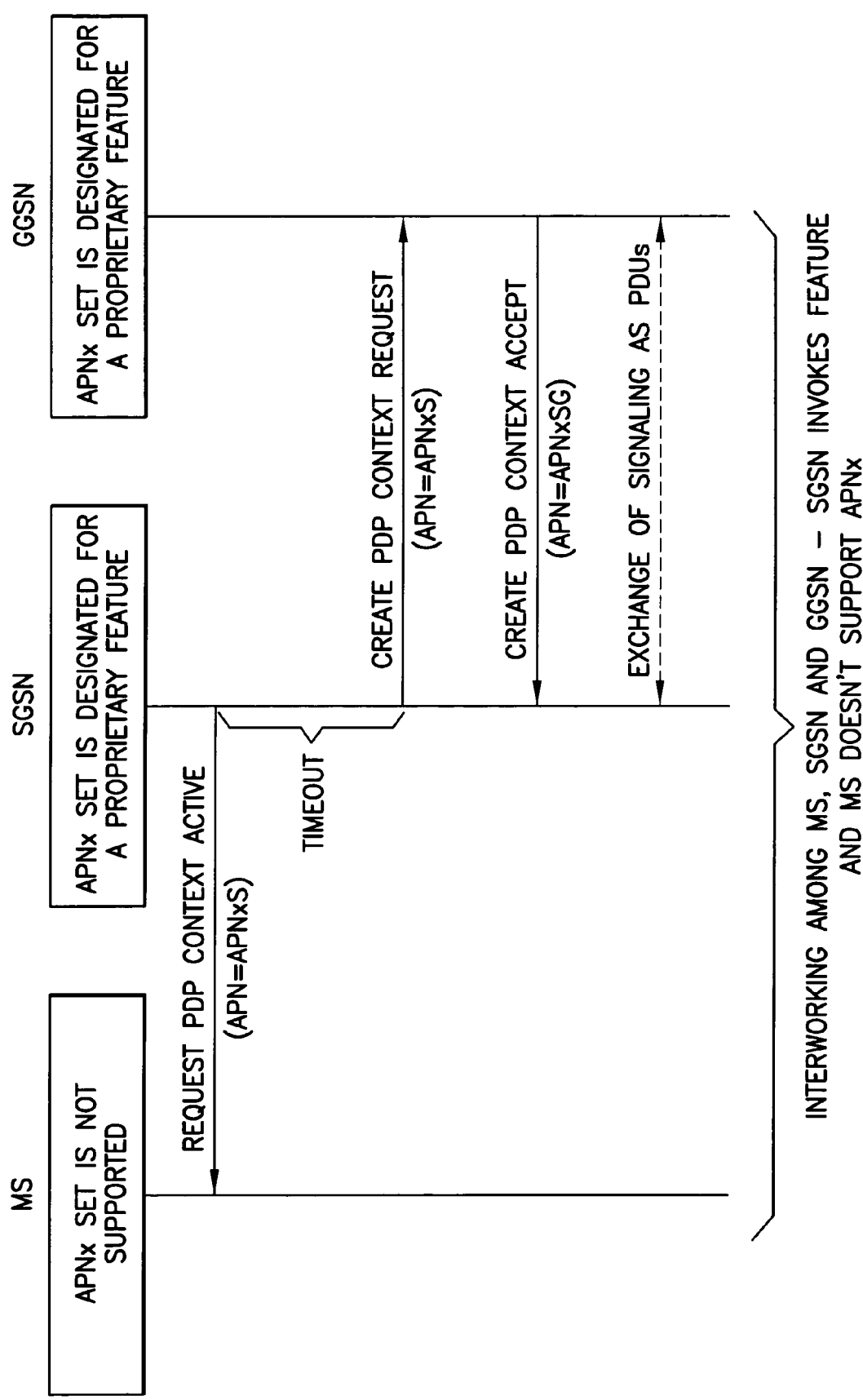

Assume now that the MS 100 does not support the Proprietary Feature. In this case the MS 100 does not send the PDP Context Activation Request message. The SGSN 38 instead sends the PDP Context Request to the GGSN 30 with APNxS. This informs the SGSN 38 that only SGSN 38 supports the Proprietary Feature. The GGSN 30 then responds with APNxSG to the SGSN 38. This case is illustrated in FIG. 24.

Figure 25:
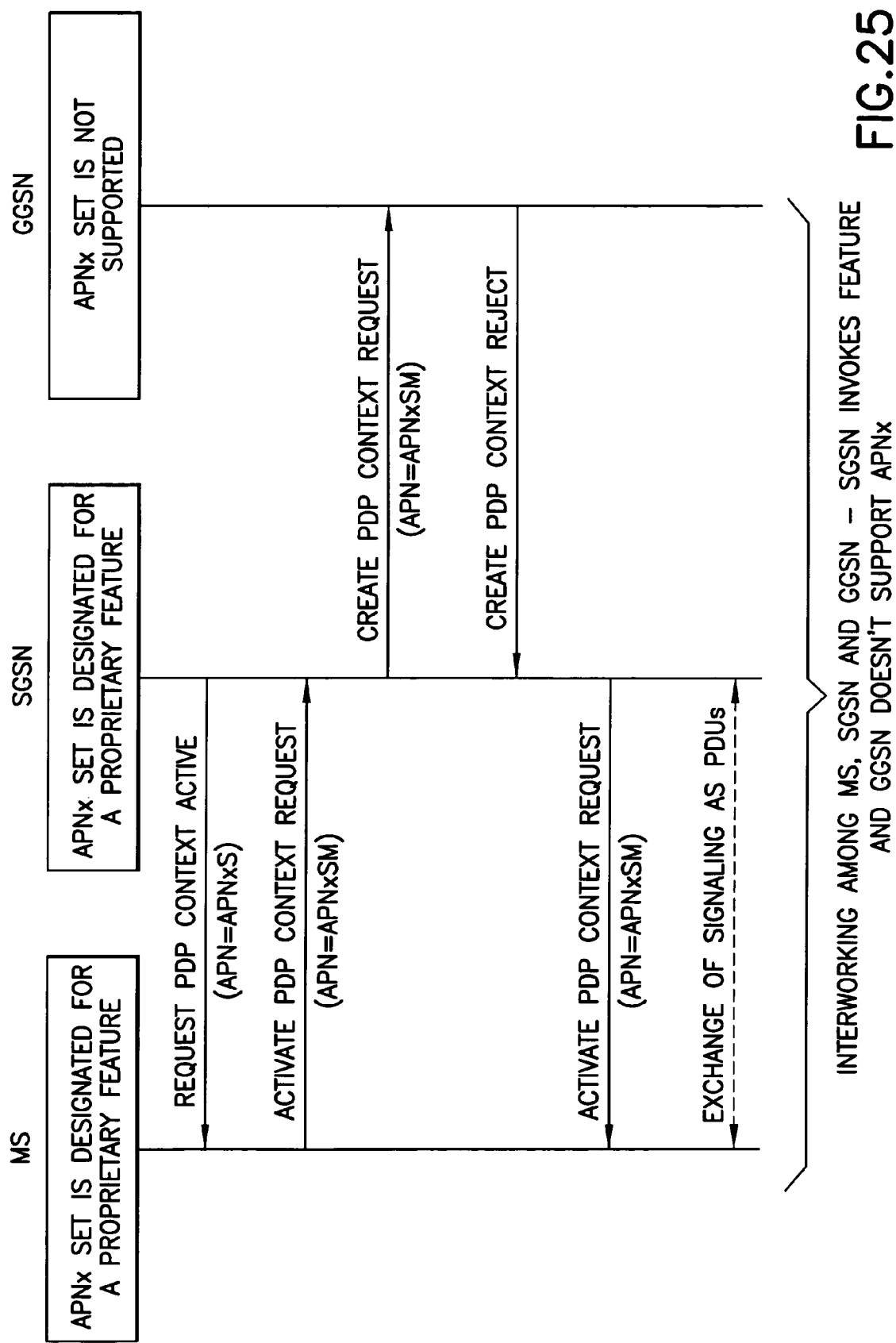

Assume now that the GGSN 30 does not support the Proprietary Feature. After recognizing that the MS 100 supports the Proprietary Feature, the SGSN 38 sends the Create PDP Context Request, with APNxSM, to the GGSN 30. The GGSN 30 does not recognize the APN and sends PDP Context Reject message to the SGSN 38. The SGSN 38 sends the PDP Context Activation Accept with the APNxSM to the MS 100. In this way, the MS 100 recognizes that only the SGSN 38 has accepted the invocation. This case is illustrated in FIG. 25.

Figure 26:
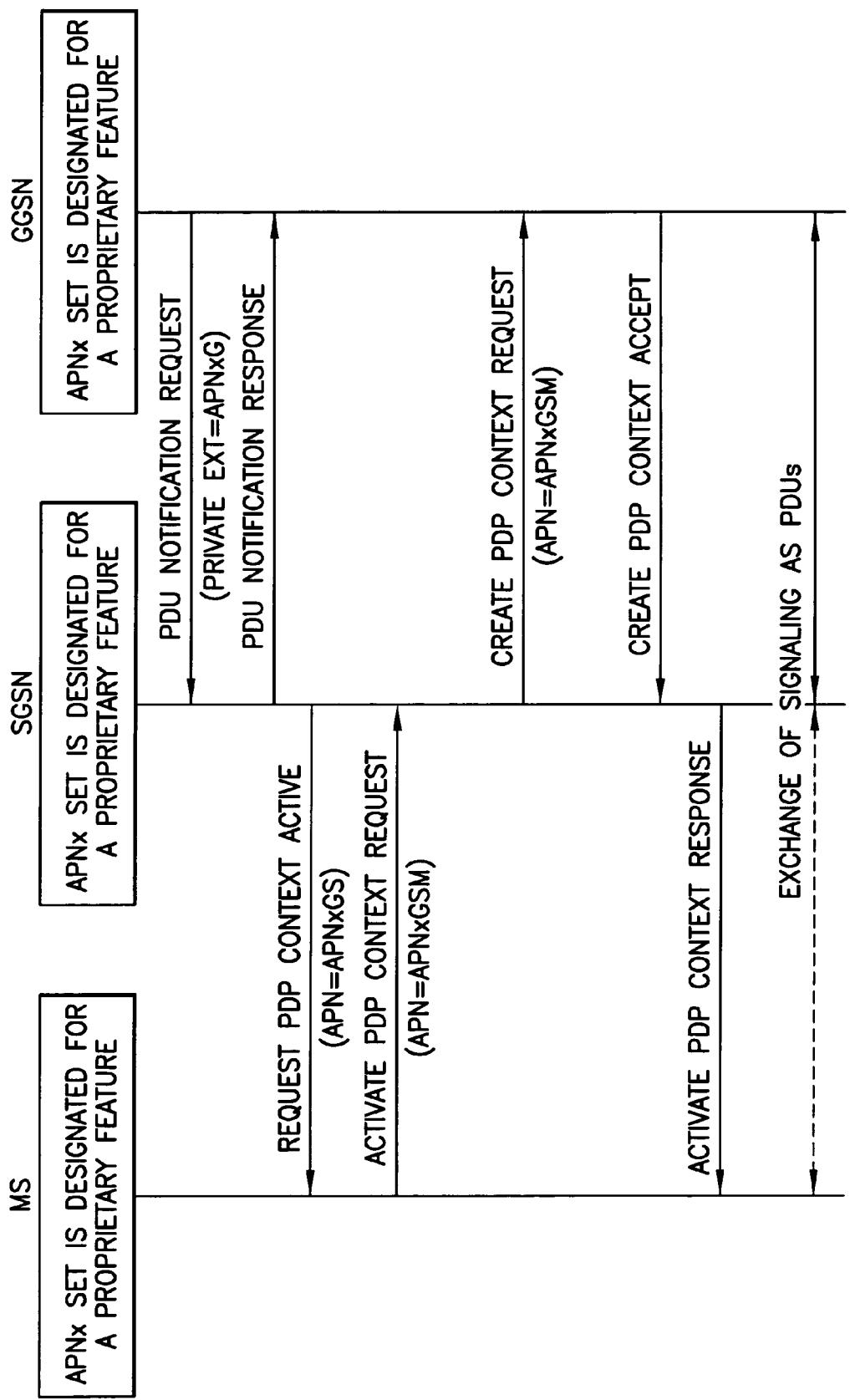

(C) Assume next that the GGSN 30 is the initiator, and that the MS 100, SGSN 38 and GGSN 30 all support the Proprietary Feature. The GGSN 30 first sends APNxG in the PDU Notification Request to the SGSN 38. The SGSN 38 sends the Request PDP Context Activation to the MS 100 with APNxGS. This informs the MS 100 that both the SGSN 38 and GGSN 30 support the Proprietary Feature. The MS 100 sends the Create PDP Context Request to the SGSN 38 with APNxGSM, and the SGSN 38 sends the Create PDP Context Request with APNxGSM to the GGSN 30. In this way, all of the NEs recognize that every other NE supports the Proprietary Feature. This case is illustrated in FIG. 26.

Figure 27:
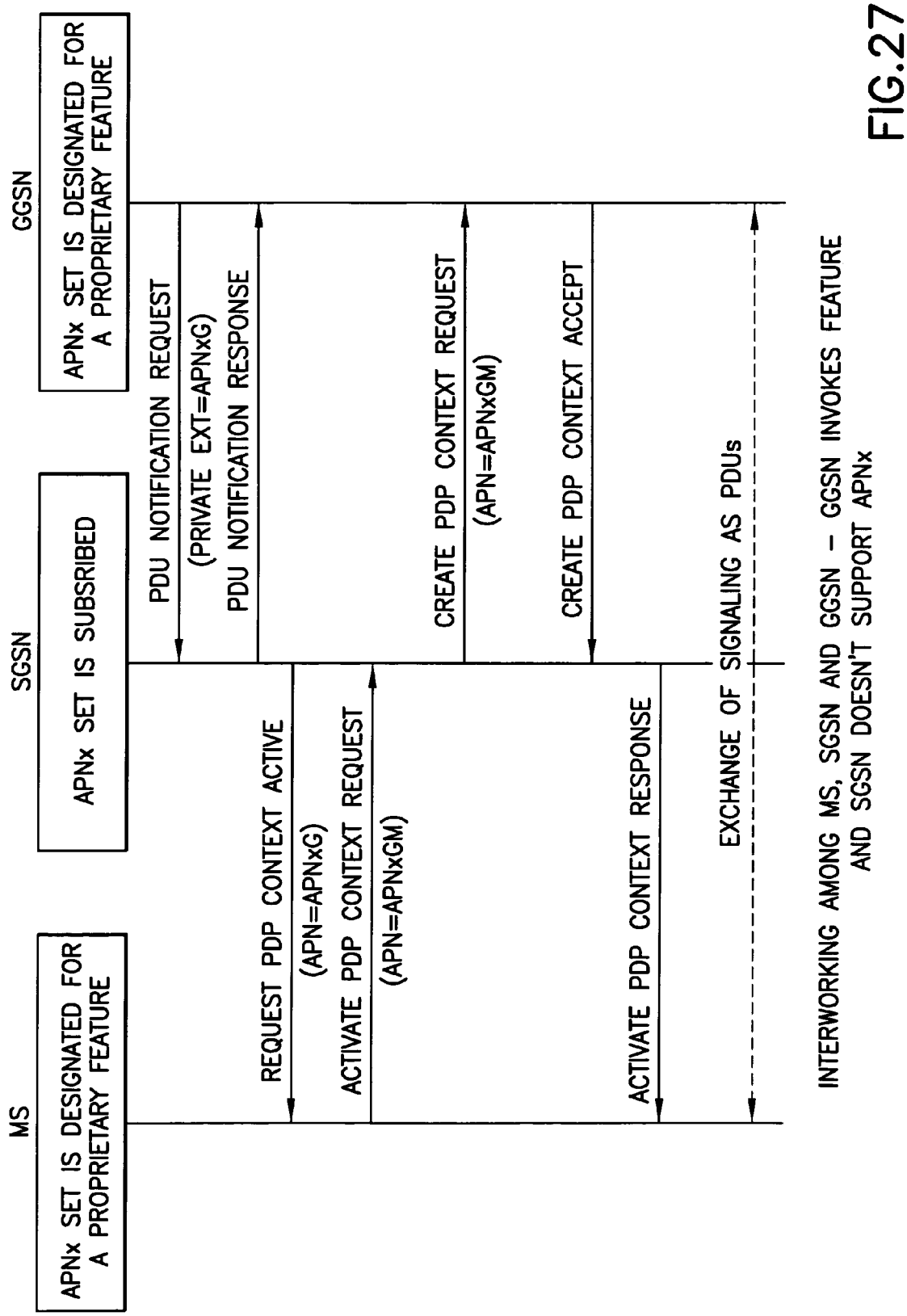

Assume now that the SGSN 38 does not support the Proprietary Feature. This case requires the designated APNxG or the Wild Card APN (see GSM 03.03 and 03.60/23.060) provisioned as subscriber data in the HLR, as discussed earlier. Furthermore, the SGSN 30 is assumed to have the ability to extract the APN from the Private Extension field. The GGSN 30 first sends the APNxG in the PDU Notification Request to the SGSN 38. The SGSN 38 sends the Request PDP Context Activation to the MS 100 with APNxG. This informs the MS 100 that only the GGSN 30 supports the feature. The MS 100, after accepting the request, places the APNxGM in the reply, which is forwarded to the GGSN 30. In this way, the GGSN 30 recognizes that only the MS 100 supports the Proprietary Feature. This case is illustrated in FIG. 27.

Figure 28:
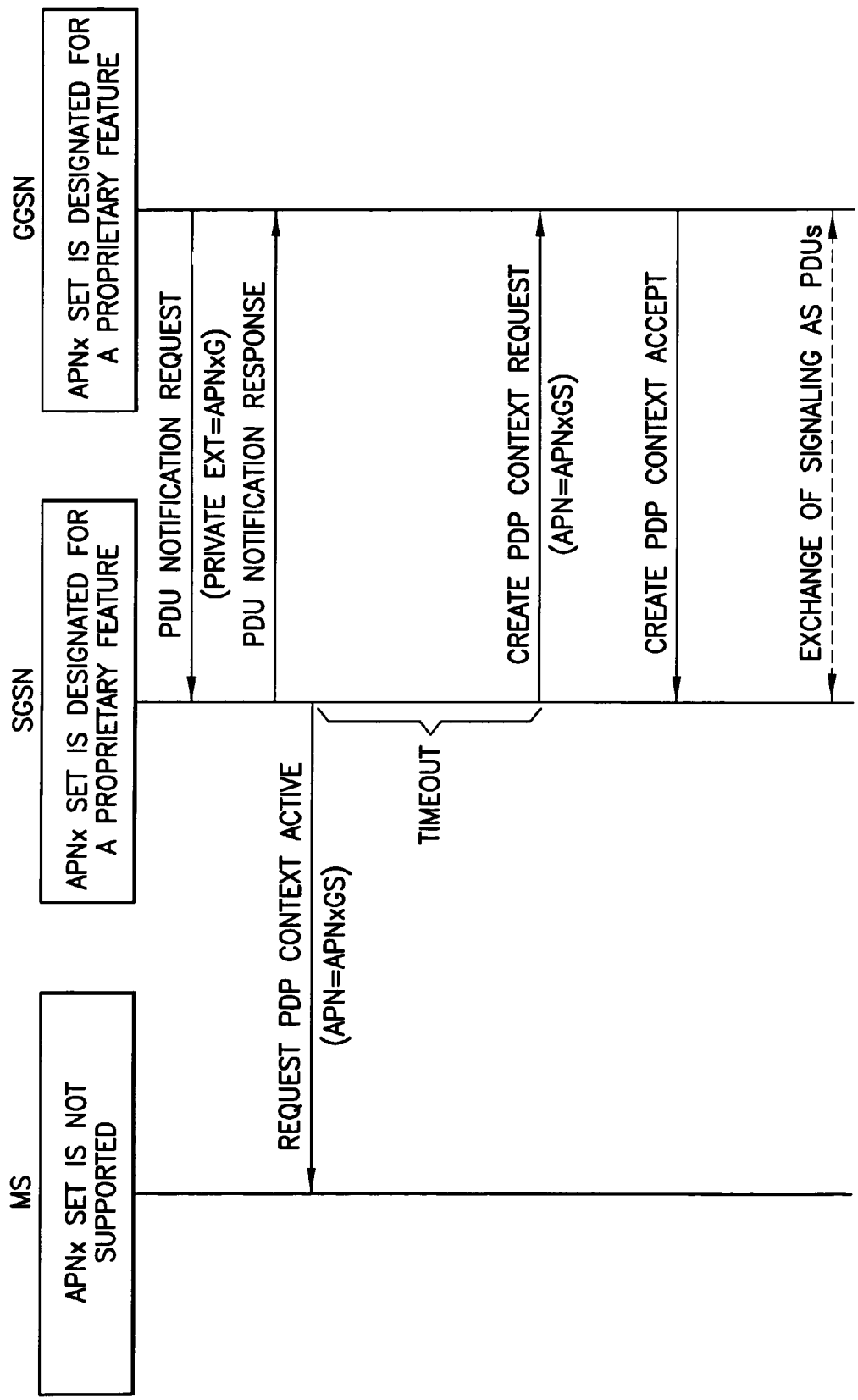

Assume next that the MS 100 does not support the Proprietary Feature. The GGSN 30 first sends the APNxG in the PDU Notification Request to the SGSN 38. The SGSN 38 sends the Request PDP Context Activation to the MS 100 with APNxGS. The MS 100 rejects the request by not responding. The SGSN 38 times out waiting for the response and thereby recognizes that the MS 100 does not support the Proprietary Feature. The SGSN 38 sends the Create PDP Context Request with APNxGS to the GGSN 30. In this way, the GGSN 30 recognizes that only the SGSN 38 supports the Proprietary Feature. This case is illustrated in FIG. 28.

In order to implement the foregoing method the MS 100 is preferably enhanced to have knowledge of the designated APN, to provide triggers for initiating PDP Context Activation with the designated APN, to recognize and accept PDP context requests with the designated APN from the SGSN 38 or the GGSN 30, and to support the above-described algorithm for determining individual NE support if the determination of individual NEs is required for the Proprietary Feature.

The GGSN 30 is preferably enhanced to have knowledge of the designated APN, to provide triggers for initiating PDP Context Activation with the designated APN, to recognize and accept PDP context requests with the designated APN from the SGSN 38 or MS 100, and to also support the above-described algorithm for determining individual NE support if the determination of individual NEs is required for the Proprietary Feature.

The SGSN 38 is also enhanced as discussed above with respect to the MS 100 and the GGSN 30, although its role changes depending on the scenario, as does the set of required enhancements for the various scenarios.

As an example, for the scenario of the interaction among the MS 100, the SGSN 38 and the GGSN 30, and where the MS initiates, the SGSN 38 enhancements that come into play are the knowledge of the designated APN, the ability to recognize and accept PDP context requests with the designated APN from the MS 100 or GGSN 30, and support for the algorithm for determining individual NE support if the determination of individual NEs is required for the Proprietary Feature. However, when the SGSN 38 initiates the SGSN 38 enhancements that come into play are the knowledge of the designated APN, the triggers for initiating PDP Context Activation with the designated APN, the ability to recognize and accept PDP context requests with the designated APN from the MS 100 or GGSN 30, and support for the algorithm for determining individual NE support if the determination of individual NEs is required for the Proprietary Feature.

In some scenarios the SGSN 38 should also support the reduced PDP Context activation procedures (those not involving the GGSN 30 or the MS 100, depending on the circumstances).

A further embodiment for determining the Proprietary Feature capability between the MS 100 and the RAN is as follows, where a modified RRC (Radio Resource Control) UE (User Equipment) Capability Enquiry procedure is provided to enquire about the ability of the MS 100, also referred to below as UE 100, to support a "Proprietary Feature" by the RAN. Reference may be made to 3GPP TS 25.331: "Radio Resource Control Protocol Specification".

By way of introduction, the RAN is the Radio Access Network for a GSM/EDGE or UMTS system. This invention is particularly useful in those cases where the proprietary feature capability needs to be exchanged only between the RAN and the MS 100. The signaling is modified to send a proprietary extension in the UE Capability Enquiry message to the UE 100 as the last element in the message. A UE 100, which does not support the Proprietary Feature, ignores the content of the extension and the message contents after the extension, but treats the parts of the message up to the extension normally as defined by the standards. A UE 100 that does support the Proprietary Feature instead accepts the proprietary extension as an enquiry for processing. The procedure may be triggered at any time after the MS 100 camps on a cell.

The following extension in UE Capability Enquiry is provided for this purpose:

Proprietary Extension Parameter in UE Capability Enquiry

| Information element | Length (Bytes) |
| --- | --- |
| Message Type | 1 |
| Random Number (Optional) | 2 |
| Signalling Payload based on the Message Type | Depends on the Message Type |

The Message Type enables the UE 100 to recognize the message and may provide support for multiple messages. For example, assume that two vendors use the same first byte for their proprietary message. To overcome this potential problem, optionally the random number is sent to the UE 100. The UE 100 uses an algorithm to generate a response and sends the response back to the RAN. The Response field is conditional based on the presence of the Random Number field in the UE 100 Capability Enquiry message. The RAN also runs the same algorithm on the random number and verifies the response. This procedure thus makes the Proprietary Feature determination more robust.

Proprietary Extension Parameter in UE Capability Information

| Information element | Length (Bytes) |
|---|---|
| Message Type | 1 |
| Response (Conditional) | 2 |
| Signalling Payload based on ALFIP Message Type | Depends on Message Type |

Those skilled in the art should appreciate that the foregoing techniques and methods can be implemented on GPRS networks, for example, on Gb and Iu-ps based GPRS networks. The following specifications and standards all pertain directly or indirectly to the networks on which this invention may operate: 3GPP TS 23.060, 3GPP TS 29.060, 3GPP TS 03.60, 3GPP TS 09.60 and 3GPP TS 24.008. The foregoing teachings may, however, be practiced in other types of networks when suitably modified, and are not intended to be limited in any way for use in GPRS/UMTS environments. Those skilled in the art should readily appreciate what modifications need to be made, when guided by the foregoing teachings and by a knowledge of the workings of the target network.

For example, a field other than the APN can be used to carry the indication for a Proprietary feature, although the APN is presently preferred due to its relatively large size. In addition, the execution method may or may not require the actual creation of a PDP Context. Also, the method can be initiated by the second NE, by using the designated APN in the Request PDP Context Activation message, or the method can be initiated by the third NE (e.g., by the GGSN 30) by placing the designated APN in the Private Extension field of the PDU Notification Request message. The SGSN 38 then extracts the APN and sends it in the Request PDP Context Activation message. The methods of this invention also provide for determining individual NE support in a multi-NE environment. The methods of this invention may also use the UE Capability Enquiry procedure.

Thus, while disclosed herein in the context of presently preferred embodiments of this invention, those having skill in the art should appreciate that changes in detail and form made be made to these embodiments, and that equivalent methods and apparatus may be employed, and that all such changes, modifications and equivalents will still fall within the scope of this invention.

What is claimed is:

1. A method for performing data compression in a wireless communication system, comprising:
  (a) sending, from a first network element, a request message to a second network element, wherein the request message includes a pre-defined indicator of a data compression/decompression algorithm;
  (b) receiving an accept message if the second network element supports the data compression/decompression algorithm;
  (c) receiving a data packet at the first network element;
  (d) if the second network element supports the data compression/decompression algorithm, compressing the received data packet at the first network element using the data compression/decompression algorithm;
  (e) if the compressed data packet has a smaller size than the received data packet, transmitting the compressed data packet through a wireless link to the second network element; and
  (f) if the compressed data packet has a larger size than the received data packet, transmitting the received data packet through the wireless link to the second network element, wherein the compressed data packet has a smaller size if a compression ratio, determined by dividing a first size of the received data packet by a second size of the compressed data packet, is greater than a threshold value.

2. A method as in claim 1, further comprising repeating (c)-(f) for a plurality of data packets.

3. A method as in claim 1, further comprising sending, from the second network element, a second request message to a third network element, wherein the second request message includes the pre-defined indicator of the desired data compression/decompression algorithm.

4. A method as in claim 3, where the first network element comprises a mobile station, the second network element comprises a serving general packet radio service (GPRS) support node, and the third network element comprises a gateway GPRS support node.

5. A method as in claim 3, where the first network element comprises a gateway general packet radio service (GPRS) support node, the second network element comprises a serving GPRS support node, and the third network element comprises a mobile station.

6. A method as in claim 3, where the first network element comprises a mobile station, the second network element comprises a serving general packet radio service (GPRS) support node (SGSN), and the third network element comprises a gateway GPRS support node (GGSN), and where the SGSN and the GGSN are located in a non-home, roamed-to wireless network of the mobile station.

7. A method as in claim 1, wherein the threshold value is one.

8. A method as in claim 1, wherein the request message is a create packet data protocol request message.

9. A node in a communications system, configured to:
  send a create packet data protocol (PDP) request to a second node, wherein the create PDP request includes a pre-defined indicator of a data compression/decompression algorithm;
  receive an accept message if the second node supports the data compression/decompression algorithm;
  receive a data packet;
  if the second node supports the data compression/decompression algorithm, compress the data packet using the data compression algorithm;
  if the compressed data packet has a smaller size than the received data packet, transmit the compressed data packet through a wireless link to the second node; and
  if the compressed data packet has a larger size than the received data packet, transmit the data packet through the wireless link to the second node, wherein the compressed data packet has a smaller size if a compression ratio, determined by dividing a first size of the received data packet by a second size of the compressed data packet, is greater than a threshold value.

10. A node as in claim 9 where in the threshold value is one.

11. A method for performing data compression in a wireless communication system, comprising:

(a) sending a request message from a first network element to a second network element, wherein the request message includes an indicator of a data compression/decompression algorithm;
(b) receiving an accept message if the second network element supports the data compression/decompression algorithm;
(c) receiving a plurality of data packets at the first network element;
(d) if the second network element supports the data compression/decompression algorithm, compressing the received plurality of data packets at the first network element using the data compression/decompression algorithm;
(e) if a first number of the compressed plurality of data packets have a smaller size than the received plurality of data packets, transmitting the compressed plurality of data packets through a wireless link to the second network element; and
(f) if a second number of the compressed plurality of data packets have a larger size than the received plurality of data packets, transmitting the received plurality of data packets through the wireless link to the second network element, wherein a compressed data packet has a smaller size if a compression ratio is greater than a threshold value, wherein the compression ratio is determined by dividing a first size of the received data packet by a second size of the compressed data packet.

12. A method as in claim 11, further comprising, if the first number of the compressed plurality of data packets have a smaller size than the received plurality of data packets, receiving a data packet at the first network element; compressing the received data packet at the first network element using the data compression/decompression algorithm; and transmitting the compressed data packet through the wireless link to the second network element.

13. A method as in claim 11, further comprising, if the second number of the compressed plurality of data packets have a larger size than the received plurality of data packets, receiving a data packet at the first network element; and transmitting the received data packet through the wireless link to the second network element.

14. A method as in claim 11, wherein the compressed data packet is transmitted with a compression indicator that indicates the data packet is compressed.

15. A method as in claim 14, wherein the compression indicator is included in a packet header.

16. A method as in claim 15, wherein the compression indicator is included in an internet protocol version field of the packet header.

17. A method as in claim 11, wherein the indicator of the data compression/decompression algorithm is included in an access point name field.

18. A method as in claim 11, wherein the request message is a create packet data protocol request message.

* * * * *